United States Patent
Frankland et al.

(10) Patent No.: US 10,616,286 B2
(45) Date of Patent: *Apr. 7, 2020

(54) INTEGRATED CHANGE MANAGEMENT UNIT

(71) Applicant: Applications In Internet Time LLC, Carson City, NV (US)

(72) Inventors: Richard Frankland, San Jose, CA (US); Christopher M. Mitchell, El Granada, CA (US); Joseph D. Ferguson, Santa Clara, CA (US); Anthony T. Sziklai, Half Moon Bay, CA (US); Ashish K. Verma, Foster City, CA (US); Judith E. Popowski, Half Moon Bay, CA (US); Douglas H. Sturgeon, San Mateo, CA (US)

(73) Assignee: Applications in Internet Time LLC, Carson City, NV (US)

( * ) Notice: Subject to any disclaimer, the term of this patent is extended or adjusted under 35 U.S.C. 154(b) by 636 days.

This patent is subject to a terminal disclaimer.

(21) Appl. No.: 15/368,160

(22) Filed: Dec. 2, 2016

(65) Prior Publication Data

US 2017/0083346 A1 Mar. 23, 2017

Related U.S. Application Data

(63) Continuation of application No. 14/932,728, filed on Nov. 4, 2015, now Pat. No. 9,542,686, which is a (Continued)

(51) Int. Cl.
*G06Q 10/10* (2012.01)
*H04L 29/06* (2006.01)
(Continued)

(52) U.S. Cl.
CPC .......... *H04L 65/1069* (2013.01); *C10G 65/04* (2013.01); *G06F 9/451* (2018.02);
(Continued)

(58) Field of Classification Search
CPC ....................................................... G06Q 40/00
(Continued)

(56) References Cited

U.S. PATENT DOCUMENTS

| | | |
|---|---|---|
| 4,803,039 A | 2/1989 | Impink, Jr. et al. |
| 5,185,699 A | 2/1993 | Reiner et al. |

(Continued)

FOREIGN PATENT DOCUMENTS

| | | |
|---|---|---|
| EP | 874306 A2 | 10/1998 |
| EP | 0861551 B1 | 8/2002 |

OTHER PUBLICATIONS

Petitioner's Request for Rehearing, Patent Trial and Appeal Board Case No. CBM2014-00162, *salesforce.com, Inc.* (Petitioner) v. *Applications In Internet Time LLC* (Patent Owner), entered Mar. 4, 2015, 18 pages.

(Continued)

*Primary Examiner* — Kirsten S Apple
(74) *Attorney, Agent, or Firm* — So Cal IP Law Group LLP; Steven C. Sereboff

(57) ABSTRACT

An integrated system for managing changes in regulatory and nonregulatory requirements for business activities at an industrial or commercial facility. Application of this system to environmental, health and safety activities, and to food, drug, cosmetic, and medical treatment and device activities, are discussed as examples. The system: provides one or more databases that contain information on operations and requirements concerning an activity or area of business; receives information on regulatory and nonregulatory changes that affect operations of the business; converts these (Continued)

changes into changes in data entry forms, data processing and analysis procedures, and presentation (by printing, electronic display and/or distribution) of data processing and analysis results to selected recipients, without requiring the services of one or more programmers to re-key and/or reformat the items affected by the change; and implements receipt of change information and dissemination of data processing and analysis results using the facilities of the Internet.

18 Claims, 13 Drawing Sheets

Related U.S. Application Data continuation of application No. 13/909,482, filed on Jun. 4, 2013, now Pat. No. 9,286,612, which is a continuation of application No. 12/912,375, filed on Oct. 26, 2010, now Pat. No. 8,484,111, which is a continuation of application No. 12/098,154, filed on Apr. 4, 2008, now abandoned, which is a continuation of application No. 09/797,488, filed on Mar. 1, 2001, now Pat. No. 7,356,482, which is a continuation of application No. 09/215,898, filed on Dec. 18, 1998, now Pat. No. 6,341,287.

(51) Int. Cl.
  *G06F 16/951* (2019.01)
  *C10G 65/04* (2006.01)
  *G06Q 10/06* (2012.01)
  *G06F 9/451* (2018.01)
  *G06Q 30/00* (2012.01)

(52) U.S. Cl.
  CPC .......... *G06F 16/951* (2019.01); *G06Q 10/06* (2013.01); *G06Q 10/063* (2013.01); *G06Q 10/0631* (2013.01); *G06Q 30/018* (2013.01); *H04L 67/42* (2013.01); *G06Q 10/10* (2013.01); *Y10S 707/99943* (2013.01)

(58) Field of Classification Search
  USPC .......................................................... 705/38
  See application file for complete search history.

(56) References Cited

U.S. PATENT DOCUMENTS

| | | | |
|---|---|---|---|
| 5,524,253 A | 6/1996 | Pham et al. | |
| 5,532,928 A | 7/1996 | Stanczyk et al. | |
| 5,611,076 A | 3/1997 | Durflinger et al. | |
| 5,664,112 A | 9/1997 | Sturgeon et al. | |
| 5,712,990 A | 1/1998 | Henderson | |
| 5,726,884 A | 3/1998 | Strugeon et al. | |
| 5,862,325 A * | 1/1999 | Reed | H04L 29/06 704/270.1 |
| 5,960,200 A * | 9/1999 | Eager | G06F 8/427 703/13 |
| 5,965,858 A | 10/1999 | Suzuki et al. | |
| 5,966,707 A | 10/1999 | Van Huben et al. | |
| 6,023,698 A | 2/2000 | Lavey et al. | |
| 6,064,977 A | 5/2000 | Haverstock et al. | |
| 6,067,549 A | 5/2000 | Smalley et al. | |
| 6,085,220 A | 7/2000 | Courts et al. | |
| 6,097,995 A | 8/2000 | Tipton et al. | |
| 6,098,096 A | 8/2000 | Tsirigotis et al. | |
| 6,122,622 A | 9/2000 | Wiitala et al. | |
| 6,154,843 A | 11/2000 | Hart et al. | |
| 6,163,732 A | 12/2000 | Petke et al. | |
| 6,167,563 A | 12/2000 | Fontana et al. | |
| 6,182,129 B1 * | 1/2001 | Rowe | H04L 29/06 709/221 |
| 6,243,717 B1 | 6/2001 | Gordon et al. | |
| 6,266,709 B1 | 7/2001 | Gish | |
| 6,314,415 B1 * | 11/2001 | Mukherjee | G06F 9/451 706/47 |
| 6,341,287 B1 | 1/2002 | Sziklai et al. | |
| 6,377,993 B1 | 4/2002 | Brandt et al. | |
| 6,493,717 B1 * | 12/2002 | Junkin | G06F 16/972 707/754 |
| 6,510,426 B1 | 1/2003 | Cohen et al. | |
| 6,606,708 B1 | 8/2003 | Devine et al. | |
| 6,615,258 B1 | 9/2003 | Barry et al. | |
| 6,654,747 B1 | 11/2003 | Van Huben et al. | |
| 6,678,682 B1 | 1/2004 | Jenkins et al. | |
| 6,754,672 B1 | 6/2004 | McLauchlin | |
| 6,766,298 B1 | 7/2004 | Dodrill et al. | |
| 6,898,645 B2 | 5/2005 | Abujbara | |
| 6,920,607 B1 | 7/2005 | Ali et al. | |
| 6,934,356 B1 | 8/2005 | Satheesan et al. | |
| 6,973,619 B1 | 12/2005 | Hirose et al. | |
| 6,990,654 B2 | 1/2006 | Carroll, Jr. | |
| 7,181,320 B2 | 2/2007 | Whiffen et al. | |
| 7,222,292 B2 | 5/2007 | Ali et al. | |
| 7,269,795 B2 | 9/2007 | Whittenberger | |
| 7,318,066 B2 | 1/2008 | Kaufman et al. | |
| 7,320,007 B1 | 1/2008 | Chang | |
| 7,356,482 B2 | 4/2008 | Frankland et al. | |
| 7,366,972 B2 | 4/2008 | Baumert et al. | |
| 7,409,710 B1 | 8/2008 | Uchil et al. | |
| 7,505,995 B2 | 3/2009 | Grealish et al. | |
| 8,484,111 B2 | 7/2013 | Frankland et al. | |

OTHER PUBLICATIONS

Decision Denying Petitioner's Request for Rehearing, Patent Trial and Appeal Board Case No. CBM2014-00162, *salesforce.com, Inc.* (Petitioner) v. *Applications In Internet Time LLC* (Patent Owner), entered Jul. 28, 2015, 7 pages.

Petition for *Inter Partes* Review of U.S. Pat. No. 8,484,111, Patent Trial and Appeal Board Case No. IPR2015-01750, *RPX* (Petitioner) v. *Applications In Internet Time LLC* (Patent Owner), entered Aug. 17, 2015, 372 pages.

Decision Patent Owner's Request for Authorization to File Motion for Additional Discovery, Patent Trial and Appeal Board Case No. IPR2015-01750, *RPX* (Petitioner) v. *Applications In Internet Time LLC* (Patent Owner), entered Oct. 1, 2015, 4 pages.

Patent Owner's Motion for Additional Discovery, Patent Trial and Appeal Board Case No. IPR2015-01750, *RPX* (Petitioner) v. *Applications In Internet Time LLC* (Patent Owner), entered Oct. 4, 2015, 266 pages.

Petitioner's Opposition to Patent Owner's Motion for Additional Discovery, Patent Trial and Appeal Board Case No. IPR2015-01750, *RPX* (Petitioner) v. *Applications In Internet Time LLC* (Patent Owner), entered Oct. 9, 2015, 26 pages.

Decision Granting Patent Owner's Motion for Additional Discovery, Patent Trial and Appeal Board Case No. IPR2015-01750, *RPX* (Petitioner) v. *Applications In Internet Time LLC* (Patent Owner), entered Oct. 20, 2015, 7 pages.

Petition for *Inter Partes* Review of Claims 1, 7-21, 27-41, and 47-59 of U.S. Pat. No. 7,356,482, Patent Trial and Appeal Board Case No. IPR2015-01751, *RPX* (Petitioner) v. *Applications In Internet Time LLC* (Patent Owner), entered Aug. 17, 2015, 501 pages.

Patent Owner's Motion for Additional Discovery, Patent Trial and Appeal Board Case No. IPR2015-01751, *RPX* (Petitioner) v. *Applications In Internet Time LLC* (Patent Owner), entered Oct. 4, 2015, 266 pages.

Petitioner's Opposition to Patent Owner's Motion for Additional Discovery, Patent Trial and Appeal Board Case No. IPR2015-01751, *RPX* (Petitioner) v. *Applications In Internet Time LLC* (Patent Owner), entered Oct. 9, 2015, 26 pages.

Petition for *Inter Partes* Review of Claims 2-6, 22-26, and 42-46 of U.S. Pat. No. 7,356,482, Patent Trial and Appeal Board Case No.

(56) References Cited

OTHER PUBLICATIONS

IPR2015-01752, *RPX* (Petitioner) v. *Applications In Internet Time LLC* (Patent Owner), entered Aug. 17, 2015, 497 pages.
Patent Owner's Motion for Additional Discovery, Patent Trial and Appeal Board Case No. IPR2015-01752, *RPX* (Petitioner) v. *Applications In Internet Time LLC* (Patent Owner), entered Oct. 4, 2015, 266 pages.
Petitioner's Opposition to Patent Owner's Motion for Additional Discovery, Patent Trial and Appeal Board Case No. IPR2015-01752, *RPX* (Petitioner) v. *Applications In Internet Time LLC* (Patent Owner), entered Oct. 9, 2015, 26 pages.
Final Written Decision, Patent Trial and Appeal Board Case No. IPR2015-01750, *RPX* (Petitioner) v. *Applications In Internet Time LLC* (Patent Owner), entered Dec. 28, 2016, 37 pages.
Final Written Decision, Patent Trial and Appeal Board Case No. IPR2015-01751, *RPX* (Petitioner) v. *Applications In Internet Time LLC* (Patent Owner), entered Dec. 28, 2016, 48 pages.
Final Written Decision, Patent Trial and Appeal Board Case No. IPR2015-01752, *RPX* (Petitioner) v. *Applications In Internet Time LLC* (Patent Owner), entered Dec. 28, 2016, 48 pages.
Decision Institution of *Inter Partes* Review 37 C.F.R. 42.108 (Public Version), Patent Trial and Appeal Board Case No. IPR2015-01750, *RPX* (Petitioner) v. *Applications In Internet Time LLC* (Patent Owner), entered May 12, 2016, 40 pages.
Decision Institution of *Inter Partes* Review 37 C.F.R. 42.108 (Public Version), Patent Trial and Appeal Board Case No. IPR2015-01751, *RPX* (Petitioner) v. *Applications In Internet Time LLC* (Patent Owner), entered May 12, 2016, 46 pages.
Decision Institution of *Inter Partes* Review 37 C.F.R. 42.108 (Public Version), Patent Trial and Appeal Board Case No. IPR2015-01752, *RPX* (Petitioner) v. *Applications In Internet Time LLC* (Patent Owner), entered May 12, 2016, 50 pages.
Buzzard, James, "dBase and SQL: Mixing Metaphors," Data Based Advisor, vol. 8, No. 6, p. 94(7), Jun. 1990, ISSN: 0740-5200.
United States Patent and Trademark Office, U.S. Office Action, dated Mar. 31, 2005 for U.S. Appl. No. 09/797,488.
United States Patent and Trademark Office, U.S. Office Action, dated Aug. 31, 2005 for U.S. Appl. No. 09/797,488.
United States Patent and Trademark Office, U.S. Office Action, dated Jan. 18, 2006 for U.S. Appl. No. 09/797,488.
United States Patent and Trademark Office, U.S. Office Action, dated Sep. 5, 2006 for U.S. Appl. No. 09/797,488.
United States Patent and Trademark Office, U.S. Office Action, dated Feb. 28, 2007 for U.S. Appl. No. 09/797,488.
United States Patent and Trademark Office, U.S. Office Action, dated Apr. 27, 2010 for U.S. Appl. No. 12/098,154.
Petition for Covered Business Method Review of U.S. Pat. No. 8,484,111, Patent Trial and Appeal Board Case No. CBM2014-00162, *salesforce.com, Inc.* (Petitioner) v. *Applications In Internet Time LLC* (Patent Owner), filed Aug. 1, 2014, 75 pages, based upon alleged prior art having dates as early as Jul. 1992.
Corrected Petition for Covered Business Method Review of U.S. Pat. No. 8,484,111, Patent Trial and Appeal Board Case No. CBM2014-00162, *salesforce.com, Inc.* (Petitioner) v. *Applications In Internet Time LLC* (Patent Owner), filed Aug. 1, 2014, 67 pages, based upon alleged prior art having dates as early as Jul. 1992.
Patent Owner's Preliminary Response in Patent Trial and Appeal Board Case No. CBM2014-00162, *salesforce.com, Inc.* (Petitioner) v. *Applications In Internet Time LLC* (Patent Owner), filed Nov. 3, 2014, 21 pages.
Decision Denying Institution of Covered Business Method Patent Review, Patent Trial and Appeal Board Case No. CBM2014-00162, *salesforce.com, Inc.* (Petitioner) v. *Applications In Internet Time LLC* (Patent Owner), entered Feb. 2, 2015, 12 pages.
Peters, Kathleen A., "The Design of a Change Notification Server for Clients of a Passive Object-Oriented Database Management System," Thesis submitted in partial fulfillment of the requirements for the degree of Master of Science in the School of Computing Science, Jul. 14, 1992, 143 pages, B.Sc, Simon Fraser University, British Columbia.

Bederson, et al., "A Zooming Web Browser," http://www.cs.unm.edu/pad++, Proceedings of SPIE Conference on Multimedia Computing and Networking, Mar. 25, 1996, 12 pages, University of New Mexico, Albuquerque, NM.
Bederson, et al. "Pad++: A Zoomable Graphical Sketchpad for Exploring Alternate Interface Physics," Journal of Visual Languages and Computing, Sep. 29, 1995, pp. 3-31, vol. 7.
Claim Chart of Kathleen A. Peters, "The Design of a Change Notification Server for Clients of a Passive Object-Oriented Database Management System," (Jul. 14, 1992) as prior art to Asserted Claims of U.S. Pat. No. 7,356,482 and Asserted Claims of U.S. Pat. No. 8,484,111, 62 pages.
Claim Chart of U.S. Pat. No. 6,243,717, to Gordon et al. (filed Sep. 18, 1998) as prior art to Asserted Claims of U.S. Pat. No. 7,356,482 and Asserted Claims of U.S. Pat. No. 8,484,111, 1998, 35 pages.
Claim Chart of U.S. Pat. No. 6,064,977, to Haverstock et al. (filed Jun. 19, 1998), as prior art to Asserted Claims of U.S. Pat. No. 7,356,482 and Asserted Claims of U.S. Pat. No. 8,484,111, 44 pages.
Claim Chart of Bederson et al., "Pad++: A Zoomable Graphical Sketchpad for Exploring Alternate Interface Physics," Journal of Visual Languages and Computing, and "A Zooming Web Browser," in Proceedings of SPIE Conference on Multimedia Computing and Networking (published Mar. 25, 1996), as prior art to Asserted Claims of U.S. Pat. No. 7,356,482 and Asserted Claims of U.S. Pat. No. 8,484,111, 28 pages.
Declaration of Benjamin B. Bederson, Petition for Covered Business Method Review Under 35 U.S.C § 321 and § 18 of the Leahy-Smith America Invents Act, U.S. Pat. No. 8,484,111 in Patent Trial and Appeal Board Case No. CBM2014-00162, *salesforce.com, Inc.* (Petitioner) v. *Applications In Internet Time LLC* (Patent Owner), filed Aug. 1, 2014, 47 pages.
Balzert, et al., "The JANUS Application Development Environment—Generating More than the User Interface," Computer Aided Design of User Interface, pp. 183-210, Jun. 5-7, 1996, vol. 96, Bochum, Germany.
Dayal. Umeshwar, "Active Database Management Systems," JCDKB, Jun. 28-30, 1988, pp. 150-167, Cambridge, MA.
Krasner, et al., "A Description of the Model-View-Controller User Interface Paradigm in the Smalltalk-80 System," Journal of Object Oriented Programing, Aug./Sep. 1988, 34 pages, vol. 1, issue 3, ParcPlace Systems, Mountain View, CA.
Szekely, Pedro, "Retrospective and Challenges for Model-Based Interface Development," Computer Aided Design of User Interfaces, Jun. 5-7, 1996, 29 pages, Information Sciences Institute, University of Southern California, Marina del Rey, CA.
Zubowski, John, "Java AWT Reference," Apr. 11, 1997, pp. 94-158, vol. 3, O'Reilly Media.
Janssen, et al., "Generating User Interfaces from Data Models and Dialogue Net Specifications," Interchi '93, Apr. 24-29, 1993, pp. 418-423, ACM, Germany.
Chart Comparing Claim Language of '111 Patent and Related Patent Application, Exhibit 1021, Petition for Covered Covered Business Method Review Under 35 U.S.C § 321 Pursuant to 37 C.F.R § 42.107, Patent Trial and Appeal Board Case No. CBM2014-00162, *salesforce.com, Inc.* (Petitioner) v. *Applications In Internet Time LLC* (Patent Owner), filed Nov. 3, 2014, 3 pages.
Microsoft Press, "Computer User's Dictionary," Jun. 1, 1998, 4 pages, Microsoft Press, Redmond, WA.
Oxford Science Publications, "Dictionary of Computing," Dec. 1983, 3 Pages, 2nd edition, Oxford University Press, New York.
IBM, "Dictionary of Computing," Aug. 1, 1993, 3 pages, 10th Edition, McGraw-Hill, Inc., New York, NY.
Petition for Covered Business Method Review of U.S. Pat. No. 7,356,482 in Patent Trial and Appeal Board Case No. CBM2014-00168, *salesforce.com, Inc.* (Petitioner) v. *Applications In Internet Time LLC* (Patent Owner), filed Aug. 4, 2014, 60 pages, based upon alleged prior art having dates as early as Jul. 1992.
Patent Owner's Preliminary Response, Patent Trial and Appeal Board Case No. CBM2014-00168, *salesforce.com, Inc.* (Petitioner) v. *Applications In Internet Time LLC* (Patent Owner), filed Nov. 4, 2014, 35 pages.

(56) References Cited

OTHER PUBLICATIONS

Decision Denying Institution of Covered Business Method Patent Review, Patent Trial and Appeal Board Case No. CBM2014-00168, *salesforce.com, Inc.* (Petitioner) v. *Applications In Internet Time LLC* (Patent Owner), entered Feb. 2, 2015, 11 pages.
Microsoft Patterns & Practices, Proven Practices for Predictable Results, "Deployment Patterns," http://msdn.microsoft.com/en-us/library/ff646997.aspx, Nov. 4, 2014, 3 pages, Microsoft.
Techopedia, "What is a Program Layer? Definition from Techopedia," http://www.techopedia.com/definition/24812/program-layer, accessed on Nov. 4, 2014, 1 page.
Techopedia, "What is a Layer? Definition from Techopedia," http://www.techopedia.com/definition/2016/layer-object-oriented-design, accessed on Nov. 4, 2014, 1 page.
Declaration of Benjamin B. Bederson, Petition for Covered Business Method Review Under 35 U.S.C § 321 and § 18 of the Leahy-Smith America Invents Act, U.S. Pat. No. 7,356,482 in Patent Trial and Appeal Board Case No. CBM2014-00168, *salesforce.com, Inc.* (Petitioner) v. *Applications In Internet Time LLC* (Patent Owner), filed Jul. 31, 2014, 51 pages.
Claim Chart of U.S. Pat. No. 6,307,572, to DeMarcken et al., issued Oct. 23, 2001, as prior art to asserted claims of U.S. Pat. No. 7,356,482 and asserted claims of U.S. Pat. No. 8,484,111, 48 pages.
Claim Chart of U.S. Pat. No. 6,154,843 to Hart, Jr. et al., issued Nov. 28, 2000, as prior art to asserted claims of U.S. Pat. No. 7,356,482 and asserted claims of U.S. Pat. No. 8,484,111, 46 pages.
Claim Chart of U.S. Pat. No. 6,314,415 to Mukherjee, issued Nov. 6, 2001, as prior art to asserted claims of U.S. Pat. No. 7,356,482 and asserted claims of U.S. Pat. No. 8,484,111, 43 pages.
Claim Chart of U.S. Pat. No. 6,493,717 to Junkin, issued Dec. 10, 2002, as prior art to asserted claims of U.S. Pat. No. 7,356,482 and asserted claims of U.S. Pat. No. 8,484,111, 81 pages.
Claim Chart of U.S. Pat. No. 6,442,563 to Bacon, et al., filed Apr. 30, 1998, as prior art to asserted claims of U.S. Pat. No. 7,356,482 and asserted claims of U.S. Pat. No. 8,484,111, 25 pages.
Claim Chart of U.S. Pat. No. 5,493,677 to Balogh, et al., filed Jun. 8, 1994, as prior art to asserted claims of U.S. Pat. No. 7,356,482 and asserted claims of U.S. Pat. No. 8,484,111, 47 pages.
Claim Chart of U.S. Pat. No. 5,550,971 to Brunner, et al., issued Aug. 27, 1996, as prior art to asserted claims of U.S. Pat. No. 7,356,482 and asserted claims of U.S. Pat. No. 8,484,111, 28 pages.
Claim Chart of U.S. Pat. No. 5,950,190 to Yeager, et al., issued Sep. 7, 1999, as prior art to asserted claims of U.S. Pat. No. 7,356,482 and asserted claims of U.S. Pat. No. 8,484,111, 61 pages.
Claim Chart of John Palinski, "Oracle Database Construction Kit," Nov. 5, 1997, as prior art to asserted claims of U.S. Pat. No. 7,356,482 and asserted claims of U.S. Pat. No. 8,484,111, 52 pages.
Claim Chart of Nancy H. Bancroft, "Implementing SAP R/3," published May 1, 1996, as prior art to asserted claims of U.S. Pat. No. 7,356,482 and asserted claims of U.S. Pat. No. 8,484,111, 37 pages.
Claim Chart of Helmut Balzert, et al., "The JANUS Application Development Environment—Generating More than the User Interface," Jun. 5-7, 1996, as prior art to asserted claims of U.S. Pat. No. 7,356,482 and asserted claims of U.S. Pat. No. 8,484,111, 62 pages.
Invalidity Contentions, Exhibit B: Web Browser and Metadata References, served Jul. 2014, 47 pages.
Petitioner's Request for Rehearing, Patent Trial and Appeal Board Case No. CBM2014-00168, *salesforce.com, Inc.* (Petitioner) v. *Applications In Internet Time LLC* (Patent Owner), entered Mar. 4, 2015, 18 pages.
Decision Denying Petitioner's Request for Rehearing, Patent Trial and Appeal Board Case No. CBM2014-00168, *salesforce.com, Inc.* (Petitioner) v. *Applications In Internet Time LLC* (Patent Owner), entered Jul. 28, 2015, 6 pages.

\* cited by examiner

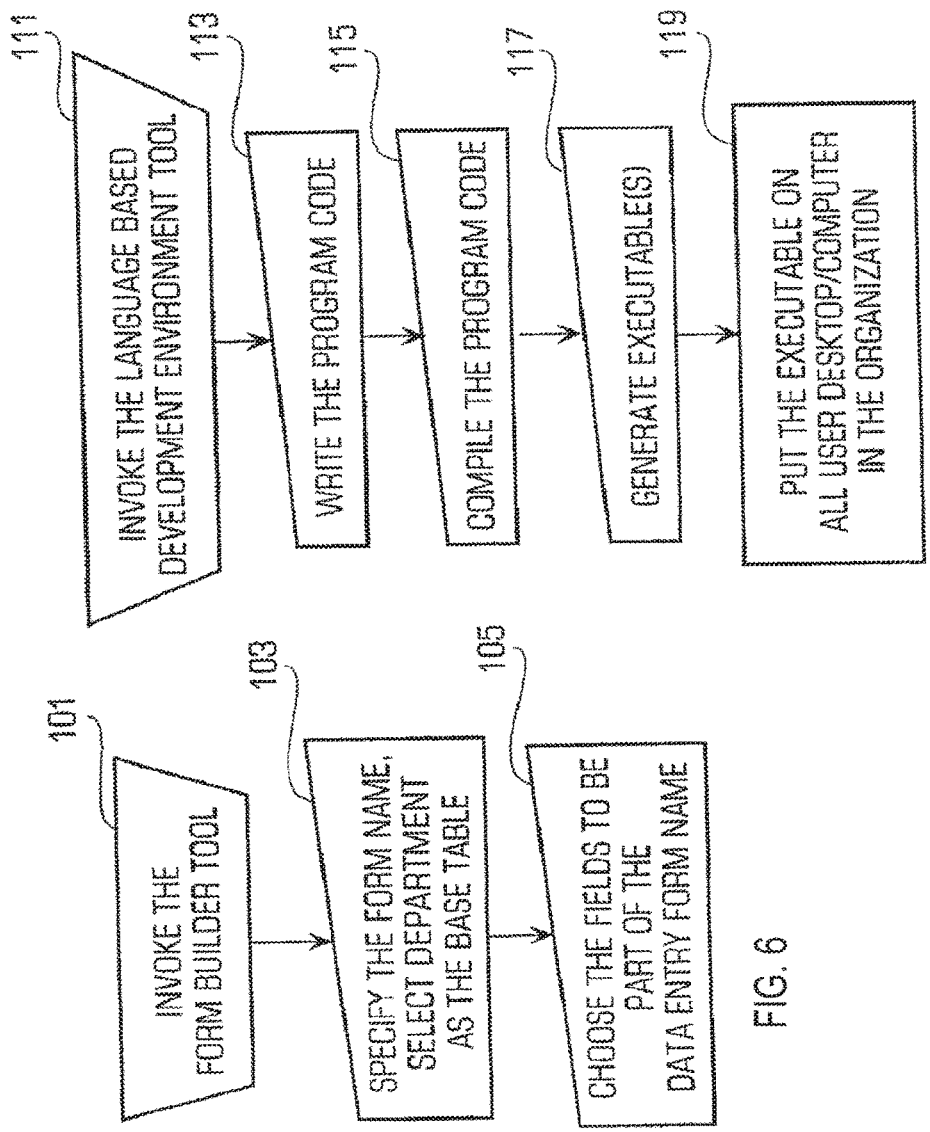

© 2016 Applications in Internet Time LLC

FIG. 10

| | DESCRIPTION | MODULE TYPE | MODULE NAME |
|---|---|---|---|
| 1 | ENTER WASTE STREAM | FORM | HAZARDOUS WASTE PROFILE |
| 2 | ENTER WASTE STREAM SOURCE CODES | FORM | WASTE PROFILE RCRA SOURCE CODE |
| 3 | ENTER WASTE STREAM EPA NUMBERS | FORM | WASTE PROFILE EPA NUMBERS |
| 4 | ENTER WASTE STREAM STATE NUMBER | FORM | WASTE PROFILE STATE NUMBERS |

Worklist — Business Area: Hazardous Materials and Waste; Group: Waste Management; Worklist: Set Up Waste Stream Data

FIG. 11

Set Up Worklist — Business Area: Hazardous Materials and Waste; Group: Waste Management; Worklist Name: Set Up Waste Stream Data

| | SEQUENCE | MODULE TYPE | MODULE NAME | WORKLIST |
|---|---|---|---|---|
| 1 | 1 | FORM | HAZARDOUS WASTE PROFILE | |
| 2 | 2 | FORM | WASTE PROFILE RCRA SOURCE CODES | |
| 3 | 3 | FORM | WASTE PROFILE EPA NUMBERS | |
| 4 | 4 | FORM | WASTE PROFILE STATE NUMBERS | |
| 5 | 5 | FORM | | |

Dropdown: FORM, REPORT, PROCESS, DOCUMENT, WORKLIST, URL

© 2016 Applications in Internet Time LLC

Data Entry Form - Air Emission Amount

| | |
|---|---|
| Monitor | null |
| Material Or Chemical | Volatile Organic Compounds |
| Estimation Basis | Estimate Based on AP-42 Emission Factors |
| Emission Calculation Date | select NATGAS_UNCONTROLLED_LBSYR(5.50,112.82) rslt from dual |
| Estimation Method | |
| Process Rate | 112.82 |
| Rate Unit of Measure | MMcft/yr |

Warning Applet Window

FIG. 12

Edit Form: Table Selection

Form Name: Air Emission Amount
Table Name: AIR EMISSION AMOUNT

Available Fields:
- AIR PARAMETER
- AIR PARAMETER2
- USERCOL2
- USERCOL3
- USERCOL4
- USERCOL5

Selected Fields:
- ID
- FACILITY
- SOURCE LOCATION
- SOURCE CATEGORY
- SOURCE PROCESS
- PARAMETER
- SOURCE EQUIPMENT UNIT
- SOURCE PERMITTED UNIT

[FORM PROPERTIES] [LINK TO] [ITEM PROPERTIES] [FORMULA] [DISPLAY]

[Back] [New] [Finish] [Cancel]

Warning Applet Window

FIG. 13

© 2016 Applications in Internet Time LLC

```
┌─ ☐ Report printing ──────────────────────── _ □ ☒ ┐
│ AIR EMISSION FEES                              ▲ │
│                                                  │
│ RUN DATE         FEE YEAR  POLLUTANT         CAS NUMBER    EMISSIONS
│ 1998-12-03 10:42:54.0  1998  FORMALDEHYDE       50000        1.1680
│ 1998-12-03 10:42:54.0  1998  BENZENE            7143203210    .5935
│ 1998-12-03 10:42:54.0  1998  PARTICULATE MATTER-PM10 789779   .5625
│
│ 1998-12-04 15:39:36.0  1998  FORMALDEHYDE       50000        1.1680
│ 1998-12-04 15:39:36.0  1998  PARTICULATE MATTER-PM10 789779   .7085
│ 1998-12-04 15:39:36.0  1998  VOLATILE ORGANIC COMPOU 5659789  .4016
│ 1998-12-04 15:39:36.0  1998  BENZENE            7143203210    .5935
│
│ 1998-12-04 15:39:55.0  1998  FORMALDEHYDE       50000        1.1680
│ 1998-12-04 15:39:55.0  1998  VOLATILE ORGANIC COMPOU 5659789  .4016
│                                                ▼ │
│ ◄                                              ► │
│ [PRINT] [SEND]                         [CANCEL]  │
└──────────────────────────────────────────────────┘
```

FIG. 14

```
┌─ ☐ Report Builder--Table/Views ─────────── _ □ ☒ ┐
│  Report    [Air Emission Fees                  ] │
│  Table/View [AUD_GS_AIR_ANNUAL_EMISSION_ FEE ▼] [     ] [Find]
│
│  Available Fields          Selected Fields
│  ┌──────────┐              ┌────────────────────┐▲
│  │RUN       │    [  >  ]   │LOCATION_NAME       ││
│  │          │    [  <  ]   │POLLUTANT_CAS_NUMBER││
│  │          │    [ >>  ]   │POLLUTANT_FEE       ││
│  │          │    [ <<  ]   │POLLUTANT_NAME      ││
│  │          │              │REPORTING_YEAR      ││
│  │          │              │RUN_DATE            ││
│  └──────────┘              │TOTAL_EMISSIONS_TONS│▼
│                            └────────────────────┘
│  [NEW VIEW]  [REPORT PROPERTIES]  [ITEM PROPERTIES]
│                      [Back] [New] [Finish] [Cancel]
└──────────────────────────────────────────────────┘
```

FIG. 15

© 2016 Applications in Internet Time LLC

FIG. 16

| | INCIDENT_DATE | LOCATION_NAME | CAS_NUMBER | MATERIAL_NAME | QUANTITY RELEASED |
|---|---|---|---|---|---|
| 1 | 03/23/1998 | ABC Company | 7782414 | FLUORINE | |
| 2 | 09/08/1998 | ABC Company | 7782414 | FLUORINE | |
| 3 | 03/23/1998 | ABC Company | 359068 | FLUOROACETYL C | |
| 4 | 09/08/1998 | ABC Company | 359068 | FLUOROACETYL C | |
| 5 | 03/23/1998 | ABC Company | 50000 | FORMALDEHYDE | |
| 6 | 09/08/1998 | ABC Company | 50000 | FORMALDEHYDE | |
| 7 | 03/23/1998 | ABC Company | 2540821 | FORMOTHION | |
| 8 | 09/08/1998 | ABC Company | 2540821 | FORMOTHION | |
| 9 | 03/23/1998 | ABC Company | 3878191 | FUBERIDAZOLE | |
| 10 | 09/08/1998 | ABC Company | 3878191 | FUBERIDAZOLE | |
| 11 | 03/23/1998 | ABC Company | 22224926 | FENAMIPHOS | |

Run Process Results — Process: GENERAL MATERIAL SPILLS ABOVE REPORTABLE QUANTITY

FIG. 17

Advanced Query Builder

Select Statement: GS_MATSPILL_EXCEEDS_RQ | GS% | Find | Refresh

Tabs: Data Sources | Columns | Clauses | Group By | Set Operations | Description | Utilities | View Tree Available Columns:
- MD.MATERIAL_ID
- RQ.MATERIAL_ID
- RQ.REPORTABLE_QUANTITY
- RQ.UOM_ID
- UOMC.FROM_UNITS
- UOMC.FROM_UOM_ID
- UOMC.MULTIPLY_BY
- UOMC.TO_UNITS
- UOMC.TO_UOM_ID, Used Columns:
- MD.INCIDENT_DATE
- MD.LOCATION_NAME
- MD.CAS_NUMBER
- MD.MATERIAL_NAME
- MD.QUANTITY_LBS
- RQ.REPORTABLE_QUANTITY
- RQ.REGLIST_NAME (●) All  ( ) Distinct Alias: RQ_LBS [Update]

Formula: RQ.REPORTABLE_QUANTITY [Add] [Delete] [Update]

[Move Up] [Move Down]

[OK] [Cancel] [Exit]

RQ.REPORTABLE_QUANTITY-UOMC_MULTIPLY (BY 1)

© 2016 Applications in Internet Time LLC

© 2016 Applications in Internet Time LLC

INTEGRATED CHANGE MANAGEMENT UNIT

RELATED APPLICATION INFORMATION

This patent is a continuation of application Ser. No. 14/932,728, filed Nov. 4, 2015, entitled "Integrated Change Management Unit," now U.S. Pat. No. 9,542,686, which is a continuation of application Ser. No. 13/909,482, filed Jun. 4, 2013, entitled "Integrated Change Management Unit," now U.S. Pat. No. 9,286,612, which is a continuation of application Ser. No. 12/912,375, filed Oct. 26, 2010, entitled "Integrated Change Management Unit," now U.S. Pat. No. 8,484,111, which is a continuation of application Ser. No. 12/098,154, filed on Apr. 4, 2008, entitled "Integrated Change Management Unit," now abandoned, which is a continuation of application Ser. No. 09/797,488, filed on Mar. 1, 2001, entitled "Integrated Change Management Unit," now U.S. Pat. No. 7,356,482, which is a continuation of application Ser. No. 09/215,898, filed on Dec. 18, 1998, entitled "Integrated Change Management Unit," now U.S. Pat. No. 6,341,287. The disclosure of each of the foregoing is incorporated herein by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field this Invention

The integrated management of information affected by regulatory changes, such as changes in environmental, health and safety laws, and non-regulatory changes Control of industrial and commercial activities by means of federal, state and local laws, statutes, ordinances and regulations ("regulations" herein) is endemic in the United States. Examples of activities that are regulated by such regulations include: environmental health and safety ("EH&S"; Titles 7, 10, 29, 30, 40, 42 and 49 of the Code of Federal Regulations and related state and local codes); administrative procedures applicable to government personnel (Title 5); agricultural activities (Titles 7 and 9); creation, use, treatment and disposal of nuclear materials (Title 10); conversion and distribution of usable forms of energy, power and water (Titles 10 and 18); banking, financial and securities activities and foreign trade Titles 12, 15, 16, 19 and 22); space and aeronautical activities (Title 14); commercial trade practices (Title 16); food, drugs, cosmetics, medical treatments and devices ("FDCMTD"; Title 21); transportation of persons and cargo (Titles 23 and 49); housing and urban development (Title 24); firearms production and trade (Title 27); workers compensation (Title 29); mining and related activities (Title 30); national defense activities (Titles 15 and 32); navigation and navigable waters (Title 33); education (Title 34); activities in and on parks, forests, public lands and other public property (Titles 36 and 43); intellectual property activities (Title 37); veterans' pensions and relief (Title 38); postal service activities (Title 39); public contracts and public property management (Titles 41 and 48); public health (Title 42); emergency management and assistance (Title (44); grant of public welfare and assistance (Title 45); telecommunications (Title 47); and wildlife and fisheries activities (Title 50). Some of the most pervasive regulations concern EH&S and FDCMTD activities.

Generation and use of hazardous substances in the United States has grown steadily in the last 53 years and is now estimated to be over 300 million metric tons per year. According to one definition, a "hazardous substance" is any substance or mixture of substances that may cause substantial personal injury or substantial illness during or as a proximate result of any customary or reasonably foreseeable handling or use, including reasonably foreseeable ingestion by children, if the substance: (1) is a toxic agent or reproductive toxin; (2) is corrosive; (3) is an irritant; (4) is a strong sensitizer; (5) is flammable, combustible or explosive; (6) is pyrophoric; (7) is a carcinogen, hepatotoxin, nephrotoxin or neurotoxin; (8) is an agent that acts on the hematopoietic system; (9) is an agent that damages the lungs, skin, eyes or mucous membranes; (10) is a compressed gas; (11) is an organic peroxide; (12) is an oxidizer; (13) is unstable, reactive or water-reactive; (14) generates pressure through decomposition, heat or other means; (15) is sufficiently radioactive to require labeling as such; (16) is a toy or other article intended for use by children and presents an electrical, mechanical or thermal hazard; or (17) is specially listed as a hazardous substance by a state or federal agency having jurisdiction over such substances.

At the federal level, special purpose hazardous substance laws and regulations, focusing on a particular hazardous substance or narrow class of such materials, have been applied for more than a century. In 1866, a federal law regulating transportation and storage of explosive and flammable materials was promulgated. This was followed in 1899, 1910, 1938, 1944 and 1947 by passage of the Refuse Act, the first Insecticide Act, the Food, Drug and Cosmetic Act, the Safe Drinking Water Act, and the Insecticide, Fungicide and Rodenticide Act, respectively. In 1955 and 1966, the Clean Air Act and the Federal Hazardous Substances Act appeared, respectively. Since 1969, the pace of introduction of new laws regulating hazardous substances has increased, and approximately 15 new major federal laws and voluminous regulations have been introduced in this area. These laws often have overlapping jurisdiction and are not always consistent with one another. Several states, such as California, have passed their own hazardous substance laws before the corresponding federal hazardous substance laws were adopted. These laws still apply in those states and in many cases supersede their Federal counterparts. These laws statutes, ordinances, regulations and related constraints are constantly changing and require corresponding changes in data entry, data analysis and presentation of the results.

The Safe Drinking Water Act ("SDWA"), originally passed in 1944 and amended several times since then, covers all drinking water supplies in all states. Primary standards, to prevent adverse effects on human health, and secondary standards and covering certain aesthetic effects such as odor and turbidity of processed drinking water, are set down in terms of maximum permissible concentrations of specified contaminants in water delivered to any public drinking water system. From a regulatory standpoint, SDWA falls under the broader mandate of the Clean Water Act ("CWA"), whose ultimate goal is maintenance of the "chemical, physical, and biological integrity of the nation's waters."

CWA, with its most recent amendment, the Water Quality Act ("WQA") of 1987, establishes mandatory effluent limitation guidelines for all facilities which discharge waste into water bodies, or allow waste to enter and potentially contaminate subsurface water sources, like aquifers. CWA created the National Pollutant Discharge Elimination System ("NPDES") to regulate effluents, influents (waterborne wastes received by a treatment facility) and sludge. The primary enforcement mechanism of NPDES is the NPDES permit. CWA directs control authorities at the federal and state level to administer and enforce permit compliance. NPDES permits include terms and conditions ranging from required monitoring of point source discharges to the implementation of control technologies to minimize outfall.

The Clean Air Act ("CAA"), passed in 1955 and amended several times since that time (most recently, in 1990), covers emission of pollutants into the ambient air and atmosphere. This may include hazardous wastes that are liquid or gaseous when discharge occurs. National Ambient Air Quality Standards ("NAAQSs") are set forth for seven chemicals or chemical groups: $SO_x$, $CO$, $NO_x$, $O_3$, $Pb$, hydrocarbons and total suspended particulates. Additionally, emission standards are set forth for asbestos, beryllium, mercury and vinyl chloride. Primary Standards are set forth to protect human health, and Secondary Standards are set to protect or limit damage to other entities, such as flora, fauna and personal and real property. The federal government in effect delegates responsibility to achieve these standards to the individual states, which are required to present and implement State Implementation Plans to achieve the target air quality standards in various identified air basins in the states.

The primary enforcement mechanism of CAA is the CAA permit. Permits covering emission source construction, modification, and operation follow the NPDES scheme, adopting strict measures for controlling and reducing emissions of airborne waste at the source. CAA permits include terms and conditions ranging from the application of abatement devices and other control technologies for emission reduction, to required monitoring at all source emission point sources and non-point sources (i.e., fugitive emission locations). Permits based on economic incentive strategies, such as marketable emission allowances, were added to the federal regulatory program maze under the 1990 amendments. Although these additions were intended to stimulate compliance via market-based vehicles (like emission allowance futures trading), these permits have not, as yet, been broadly implemented.

The Toxic Substances Control Act ("TSCA"), originally passed in 1965, together with the Federal Hazardous Substances Act ("FHSA") passed in 1966 and the Resource Recovery Act ("RRA") passed in 1970, were the initial federal laws governing generation and handling of toxic and other hazardous substances. Most provisions of the RRA and the FHSA have been incorporated in the Resource Conservation and Recovery Act, discussed below. Under TSCA, the Environmental Protection Agency ("E.P.A.") reviews any chemical substance that is or will be produced in sufficient quantity that it may cause significant acute or chronic human exposure. Testing is performed with respect to human health and the environment and focuses particularly on possible risk of serious harm to humans from (1) cancer, (2) genetic mutations and (3) birth defects. If the EPA finds that the risk to human health or to the environment is sufficiently great, the EPA may: (1) limit the amount of the chemical to be manufactured or used; (2) prohibit a particular use; (3) require placement of warning labels on all containers of the chemical; (4) require placement of public notices of use; and (5) regulate commercial use and/or disposal of the chemical.

Any person, including a company, that manufactures or imports more than 10,000 pounds or more of a chemical named on an E.P.A. Chemical Substances Inventory List is subject to the reporting requirements under TSCA. These reporting requirements include: (1) updating of a list of all chemicals present on a site, at four-year intervals or more frequently; (2) submission (to the E.P.A.) of a Pre-manufacture Notice and relevant test data for any new chemical, at least 90 days before manufacturing or importing the chemical; (3) submission of a Notice Of Intent To Import or To Export a listed chemical, within seven days after entering into a contract to import or export the chemical, if the chemical is known to be mutagenic, teratogenic or carcinogenic or is known to cause chronic health or environmental problems; (4) reporting of a significant new use for a chemical already on the E.P.A. list; (5) reporting of known significant adverse reactions caused by handling or discharge of any chemical used by the reporting entity; (6) submission of any unpublished health and/or safety studies on certain chemicals used by the reporting entity; (7) notification of any substantial risk of injury to human health or the environment, due within 15 days after the reporting entity first receives information on the risk; (8) submission of information on production of, use of and exposure to certain chemicals to an Interagency Testing Committee for analysis by the Committee; (9) submission of specified comprehensive information on a fixed format reporting form; (10) submission of results of tests, if any, performed by the reporting entity on certain hepta-halogenated dibenzo-p-dioxins and dibenzofurans, within 90 days after a test, if a positive result is obtained; and (11) submission of a Notification of PCB Activity form by any storer, transporter or disposer of polychlorinated biphenyl ("PCB") waste. TSCA also sets forth certain requirements for labeling of, disposal of and recordkeeping for certain chemicals, such as PCBs.

The Occupational Safety and Health Act ("OSHA"), passed in 1970, covers the conditions under which employees work. The regulations issued under OSHA make this Act among the most detailed of all workplace laws. The relevant parts of OSHA prescribe standards for the protection and welfare of employees exposed to workplace hazards. An employer must establish a written hazard communication plan to advise its employees of hazards associated with chemicals the employees handle, and incorporate into this plan the use of container labels, warning signs, Material Safety Data Sheets ("MSDSs") and training programs. The centerpiece of the OSHA Hazard Communication Standard is the MSDS, required for each hazardous substance manufactured or used on the site. The MSDS includes all relevant information pertaining to a hazardous substance, from its ingredients to physical properties, health hazards, exposure limits, storage incompatibilities, safe handling and use precautions and much more. An employer must report, within 48 hours, any incident that results in a fatality, or in hospitalization of five or more employees. The OSHA Log and Summary of Occupational Injuries and Illnesses form is used to record all work-related injuries and illnesses for each calendar year. Many such records must be maintained by the employer for the duration of employment of an employee, plus 30 years. An employer must develop and implement a written emergency plan and make the plan available in the workplace, whenever an OSHA standard requires it. An employer must also develop and implement a written safety and health program and a medical surveillance program for employees involved in hazardous waste operations, including emergency response procedures.

The Occupational Health and Safety Administration ("O.S.H.A.") under the Department of Labor (D.O.L.) develops and enforces all OSHA standards. The O.S.H.A. primary enforcement activity is the inspection, or audit procedure. Facilities covered by one or more OSHA standard are subject to voluntary (routine) inspections, as well as non-voluntary inspections based on a warrant to search.

The Hazardous Materials Transportation Act ("HMTA"), passed in 1974, is administered jointly by the Department of Transportation ("D.O.T."), established in 1966, and the E.P.A., established in 1969. The HMTA sets forth 15 hazard classes of materials (e.g., flammable liquids, high explosives, poisons) plus five classes of "other regulated materials" and sets forth laws and corresponding regulations on: (1) identification, listing, labeling and placarding of these hazardous substances; (2) recordkeeping requirements for handling these hazardous substances, including Uniform Hazardous Material Manifests for shipment of hazardous wastes; (3) requirements for generators and transporters of hazardous substances and for owners and operators of specially defined treatment, storage and disposal facilities ("TSDFs") for these hazardous substances; (4) permit and pretransport notification requirements and transportation routing for all facilities that generate or transport these hazardous substances; (5) requirements for tracking the movement of these hazardous substances; (6) containers to be used for transport; (7) incident notification and other procedures for handling and reporting accidental and intentional discharges of hazardous substances; and (8) testing and standards for operators of transport vehicles for hazardous substances. Hazardous wastes and other hazardous substances are not distinguished under the HMTA. A "generator" of a hazardous waste is defined simply as "any person whose act first causes a hazardous waste to become subject to regulation". Transportation modes covered include movement of the hazardous substance by air, rail, water and highway. The D.O.T. is authorized to inspect generator and transporter facilities, vehicles and records to insure compliance.

The Resource Conservation and Recovery Act ("RCRA"), passed in the present form in 1976, was originally part of the Clean Air Act, passed in 1966. The RCRA establishes "cradle-to-grave" responsibility for hazardous solid waste handled by a generator, by a TSDF operator, or by a hazardous waste transporter or recycler. Under RCRA, a solid waste is a "hazardous waste", if: (1) the waste arises from specified manufacturing practices; (2) the waste is one of a group of specified wastes; (3) the waste contains any of a group of specified chemicals; or (4) the waste has specified toxicity, chemical reactivity, ignitability or corrosive characteristics. Household wastes are generally exempted from RCRA coverage. Generators of more than 1,000 kilograms per month of ordinary hazardous wastes or of more than 1 kgm per month of extremely hazardous waste must operate under a RCRA permit covering registration, container labeling, recordkeeping and other requirements. "Small quantity generators", who generate 100-1,000 kgms per month of hazardous wastes and no more than 1 kgm per month of extremely hazardous wastes, are covered by simpler requirements. Generators of still smaller amounts of the hazardous wastes or the extremely hazardous wastes are often exempt from regulation under RCRA.

The goals of RCRA include: (1) protecting the health, safety and environment of the public; (2) regulating the generation, treatment, disposal and storage of hazardous wastes; (3) reducing environmental pollution from waste disposal; (4) encouraging recycling and/or re-use of hazardous wastes; and (5) eliminating certain landfill and other solid waste disposal practices. A Notification of Hazardous Waste Activity must be submitted by a generator, transporter or operator of a hazardous waste TSDF to apply for an E.P.A. identification number and for any applicable E.P.A. permits for on-site treatment, storage or disposal. Hazardous waste generators are required to conduct their own studies to determine if a specific hazardous waste can be treated to reduce its volume or toxicity, with records of such studies being submitted each year to the E.P.A. and being maintained for three years.

A Uniform Hazardous Waste Manifest, developed by the E.P.A. under RCRA and under HMTA, must be used by persons who transport hazardous waste for off-site treatment, storage or disposal, and a copy of each Manifest must be maintained as part of a facility's operating record. Owners or operators of a TSDF who receive hazardous waste without a proper Manifest must submit an Unauthorized Waste Report to the E.P.A. within 15 days after such an incident occurs. Upon closure of a hazardous waste facility, records of hazardous waste disposal and the amounts thereof must be submitted to the E.P.A. and to local land use control authorities.

A hazardous waste generator must demonstrate that it has the financial ability to cover liability claims involving sudden or non-sudden discharges from the facility. An owner or operator must monitor and inspect all on-site tanks that treat or accumulate hazardous waste. A spill or other discharge must be reported to the National Response Center ("N.R.C.") within 24 hours after the incident occurs, and a detailed report on such incident must be submitted to the E.P.A. within 30 days after the incident. RCRA is enforced concurrently with applicable state statutes.

The Comprehensive Environmental Response, Compensation and Liability Act ("CERCLA") was passed in 1980 in response to the discovery of several hazardous waste disposal sites that would have to be cleaned up at government expense. CERCLA was intended to: (1) provide a system for identifying and cleaning up chemical and hazardous substance releases; (2) establish a fund to pay for cleanup of release sites, where those responsible cannot or will not pay for the cleanup; and (3) enable the federal government to collect the costs of cleanup from the responsible parties. The federal government set aside $1.8 billion in the first Superfund for hazardous waste site clean-up purposes. CERCLA includes on its hazardous substance list all hazardous wastes under RCRA, all hazardous air pollutants regulated under the CAA, all water pollutants regulated under the CWA, and most substances regulated under TSCA.

In 1986, the Superfund Amendments and Reauthorization Act ("SARA") added another $6.2 billion to the Superfund for clean-up purposes SARA also enacted Community-Right-to-Know requirements into law. Title III of SARA contains the Community Right-to-Know requirements and provides for: (1) Emergency Response Planning; (2) Accidental Release Notification; (3) Facility Hazardous Substance Inventory Reporting; and (4) Facility Toxic Substance Release Reporting.

Sections 301-303 of Title III enacted the requirement for Emergency Response Planning. Emergency Response Planning as enacted by SARA required the creation of committees at both State (State Emergency Response Committee, or S.E.R.C.) and Local (Local Emergency Planning Committee, or L.E.P.C.) levels. Owner/operators of facilities with specified hazardous substances on site in quantities in excess of specified thresholds are required to prepare and submit Emergency Response Plans to the L.E.P.C. having jurisdiction over the facility. Elements of the facility Emergency Response Plan include: (1) identification of Emergency Response procedures to be used for action on the site and for areas surrounding the site; (2) identification of a facility coordinator for implementing the plan; (3) procedures to be used during emergencies for notifying authorities and potentially affected parties; (4) methodology for determination when a release has occurred and the probable area and population at risk; and (5) description of Emergency Response assets that are in place as well as the contact point for the Emergency Response assets.

Section 304 of Title III requires preparation and filing of an Accidental Release Notification report whenever an accidental release of a specified hazardous substance occurs in which (1) the substance crosses the facility boundaries or is released in transport on public roads, and (2) the release amount exceeds specified thresholds. This report must address: (1) actions taken to contain or respond to the release; (2) any known or anticipated acute or chronic health risks associated with the release; and (3) advice regarding medical attention required for any exposed individuals.

Section 311 and 312 of Title III provide for facility hazardous substance inventory reporting. Facility hazardous substance inventory reporting is required if substances for which an MSDS is required under OSHA are present in quantities in excess of specified thresholds. Facilities subject to hazardous substances inventory reporting requirements must: (1) produce a listing of specified hazardous substances present at the facility or an MSDS for each specified hazardous substance; and (2) an emergency and hazardous chemicals inventory report form. Both reports (listing/MSDS and inventory report) must be submitted to the following agencies: (1) L.E.P.C.; (2) S.E.R.C.; and (3) local Fire department.

Section 313 of Title III requires the E.P.A. to establish an inventory of toxic chemical emissions from certain facilities. To do so, the E.P.A. requires owners and operators of facilities that manufacture, import, process, or use specified toxic chemicals to report annually their releases of those chemicals to any environmental media. Releases to air, water, and land, and releases to off-site locations such as publicly owned treatment works or hazardous waste disposal sites, must be estimated and reported under Section 313. Both routine and accidental releases must be reported. Facilities must report even if their releases comply with all environmental laws and permits.

The Pollution Prevention Act ("PPA"), passed in 1990, requires hazardous waste generators and other similar facilities that manufacture, import, process or otherwise use listed toxic chemicals to annually report releases of any of these chemicals to any environmental medium (atmosphere, water, soil and biota). For each listed chemical that is reported, the generator must provide: (1) the quantity of the chemical that is released (before recycling, treatment or disposal) into a waste stream and the change, if any, from release in the preceding year; (2) the quantity of the chemical, if any, that is recycled or treated at the facility or elsewhere, the percentage change from the preceding year and the method(s) of recycling or treatment used; (3) the source reduction practices adopted by the generator and the quantitative method(s) used to monitor these practices, with these practices being reported in the categories of (a) equipment, technology, process or procedure modifications, (b) reformulation or redesign of the products, (c) substitution of input materials and (d) improvement in management, training, inventory control, materials handling or other administrative practices; (4) quantities of the chemical, if any, that are released in one-time events not associated with production processes; (5) quantities of the chemical expected to be released into a waste stream or to be recycled in each of the two immediately following years; and (6) a ratio or other quantitative comparison of production of the chemical between the current and preceding reporting years. Much of this information would be reported on a revised Form R under SARA Title III for each listed chemical.

Various attempts have been made to manage regulatory compliance, but no solution has been developed before that provides a comprehensive, integrated framework for (1) absorbing business changes into the application and database without affecting the integrity of the system, (2) automatically making application and database changes using intelligent agent routines, (3) managing technical and business content-related functionality using metadata tables rather than relying on traditional programming methods. Other workers have created regulations databases, document management systems and other partial solutions for tracking changes in, and compliance with, regulations and similar requirements, but these partial solutions have not addressed the effects of change across an integrated database application or across an integrated framework of technical functions. These partial solutions also do not provide a "closed loop" approach to identifying changes using intelligent network agents, recommending modifications to the business content, and automatically effecting modifications in the system without the use of programmers and/or programming.

One recurring problem with any database that frequently changes is maintenance of the database as current. Where a database depends upon the current regulatory state, as where an EH&S database is being maintained by a conventional approach, continual reprogramming of the database software is required to reflect a constant stream of changes. This approach is not cost effective and, in effect, mortgages the database maintainer's future.

What is needed is an integrated change management system for a selected area of commercial or industrial activity that: (1) provides one or more databases having all relevant available information, including knowledge of regulatory and non-regulatory information and changes, used in connection with the activity; (2) facilitates sharing of this information between databases; (3) generates and archives records of software system versions used for data entry, reporting, processing, analysis and results presentation, and changes to these versions; (4) generates all documents and reports required for compliance under applicable regulations, laws and statutes; (5) provides screen images, and appropriate changes to these images, that implement data entry, processing, analysis, reporting and results presentation; and (6) allows entry of the changes and modification of the affected data entry forms, report forms, views, screen images, functions, processes and formulas, without requiring (re)programming of the underlying software.

DESCRIPTION OF THE DRAWINGS

FIGS. 6 and 7 are flow charts comparing procedures for creating a data entry form, using the invention (FIG. 6) and using a conventional approach (FIG. 7).

FIGS. 8-19 are examples of screen images used in application of the invention to EH&S activities.

DETAILED DESCRIPTION

Summary of the Invention

These needs are met by the invention that, in one integrated system, (1) provides one or more databases that contain information on operations and requirements concerning an activity or area of business; (2) monitors and evaluates the relevance of information on regulatory and non-regulatory changes that affect operations of the business and/or information management requirements; (3) converts the relevant changes into changes in work/task lists, data entry forms, reports, data processing, analysis and presentation (by printing, electronic display, network distribution and/or physical distribution) of data processing and analysis results to selected recipients, without requiring the services of one or more programmers to re-program and/or recode the software items affected by the change; and (4) implements receipt of change information and dissemination of data processing and analysis results using the facilities of a network, such as the Internet

Description of Best Modes of the Invention

The invention provides an integrated system for managing data that is, or can be, constantly changing, because of changes in regulations, in the business environment, in technology and in any other factor that materially affects operations and/or information management requirements of a particular business. Without an integrated method for automatically handling such changes, a developer or user of software that tracks business operations must continually rewrite part or all of the software in order to accurately and fully reflect these changes, usually at great expense and effort and with little hope for relief.

This invention monitors, responds to, and incorporates changes in, federal, state and local laws, statutes, ordinances and regulations (referred to collectively herein as "regulations") and changes in technology in one or more regulated areas of commercial activity, such as environmental health and safety (EH&S), and food, drugs, cosmetics, medical devices and treatments ("FDCMTD"). Initially, making applicable laws and regulations available and searchable gives rise to data management requirements and to development of one or more suitable databases. Implementation of a database carries with it questions concerning initial investment, maintenance and upgrade costs, integrity and security concerns. When one or more of the applicable regulations changes, this affects the data management requirements and the underlying database(s) and any existing software linkages between related database structures. The invention provides a relatively seamless system for creating robust solutions without the use of programmers and/or programming, (2) monitoring and assimilating business change into business solutions rapidly, without (re) programming, and (3) providing business solution customization and extensibility without impacting the integrity or security of the system.

Figure 1:
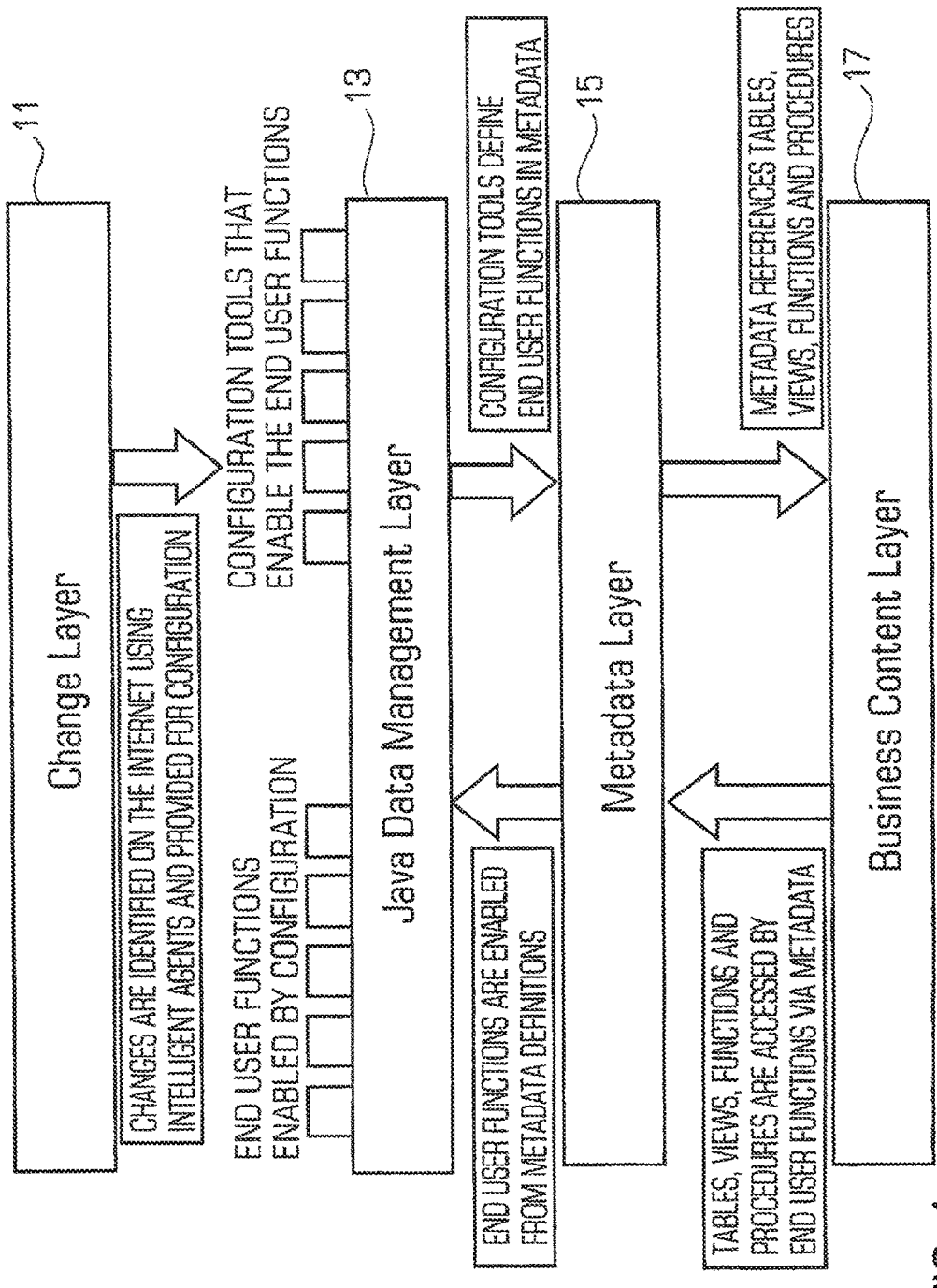
FIG. 1 schematically illustrates the relationship of four layers that are the primary components of the invention.
Figure 2:
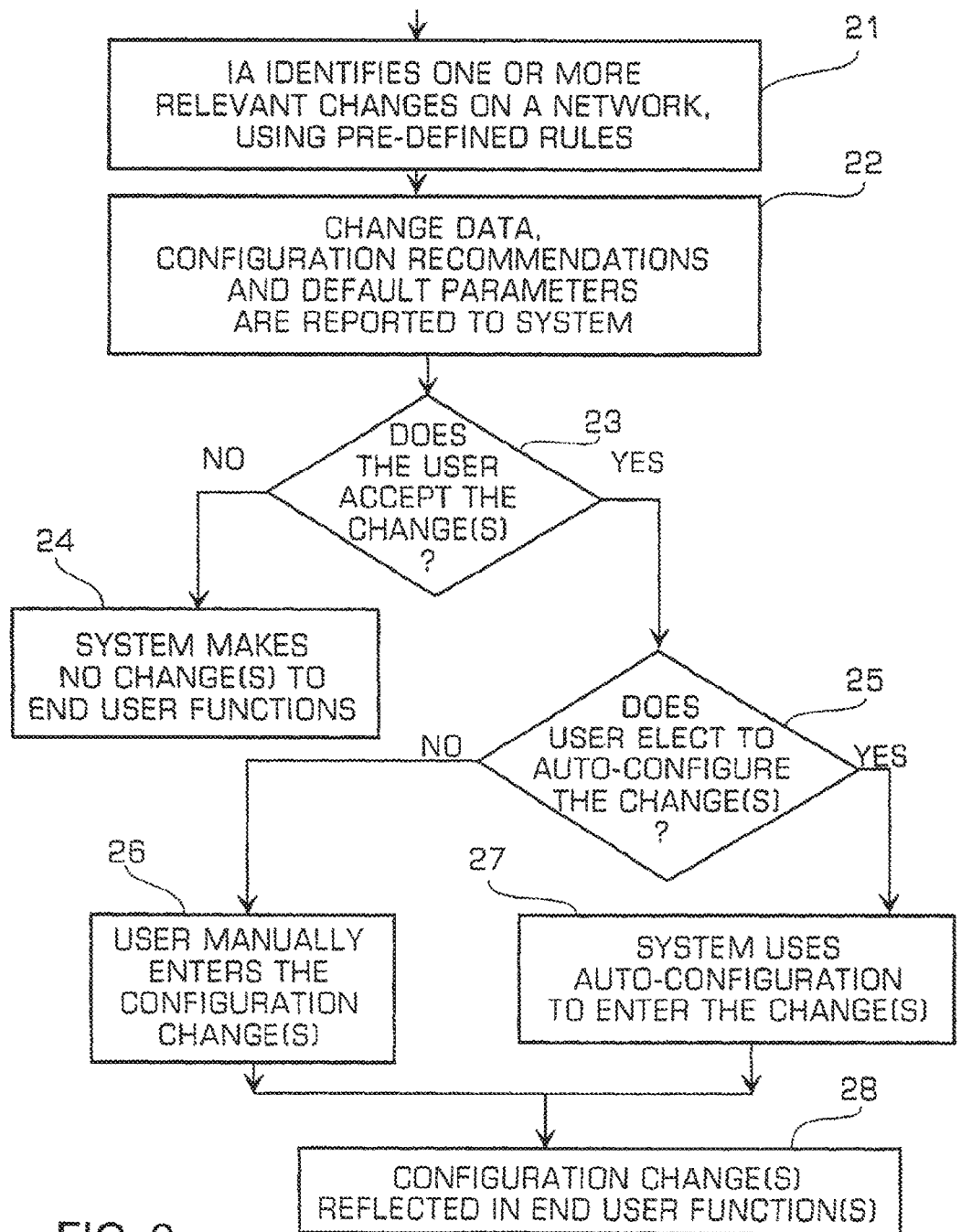
FIG. 2 is a flowchart illustrating use of the invention to respond to one or more relevant changes found by an intelligent agent on a network.

The system operates at four layers, as illustrated in FIG. 1: (1) a change management layer 11 that includes one or more change agents that "cruise the Web" and identify and bring to the user's attention relevant regulatory and non-regulatory changes found on the Web that may affect a user's business; (2) a Java data management layer 13, a user interface, built using the Java language, that applies metadata attributes to business and business-change related data (regulation-based or non-regulation-based); (3) a metadata layer 15 that provides and/or defines data about every feature of the user interface including, without limitation, tools, worklists, data entry forms, reports, documents, processes, formulas, images, tables, views, columns, and other structures and functions; and (4) a business content layer 17 that is specific to the particular business operations of interest to the user.

Within the Java management layer, configuration tools take the place of a programmer and define various end user functions in terms of metadata, and metadata definitions are used to implement the desired end user functions. Within the metadata layer, the relevant items (data entry forms, etc.) in the business content layer are defined, regulatory and non-regulatory changes in these items are implemented, and access thereto is provided. Within the business content layer, the relevant items are stored (and changed, as appropriate) for the specific business operations of concern to the end user. A business area or grouping in the business content layer is referenced and described by the metadata layer to enable management by the data management layer. The system's four layers, plus the Configuration tools and the End User tools, are illustrated in FIG. 1.

The invention includes an integrated framework of technical functions for tracking and managing regulatory compliance, non-regulatory requirements and other change-intensive business activities. The invention provides a cost-effective approach for absorbing database and application changes that arise from changes in regulations, policies, procedures, processes, materials, and similar factors. The integrated framework of the invention is divided into two main groupings, Change Configuration functions and End User functions. The Change Configuration functions support creation and change of End User functions through a variety of flexible and intelligent manual routines, such as intelligent agents, screens, fields, reports, documents and logic that can be changed without requiring programming skills. The End User functions support business-related activities, such as data entry, data analysis, document generation, document distribution and reporting, that are utilized by a typical business user.

The metadata architecture is unique in that it stores all of the information used to create the front-end business application and manage the back-end business database. Unlike "hard-coded" systems, in which business functionality and content is managed by explicit lines of code, the metadata architecture of the invention is entirely data-driven.

Regulations and technical requirements are constantly changing in the United States. Regulatory changes are recorded and posted for reference in different media, including paper, microfiche and electronic media. The internet is one source of information on regulatory change that is both prompt and cost-effective. The following example illustrates how a change, made to a regulation, is identified on the Internet and incorporated and managed by the invention.

A. Example

Assume that a federal regulation, governing disposal of hazardous waste in landfills, is amended so that the regulation now requires analysis, reporting and record keeping of landfill samples. Part of the change language addresses what landfill sample information must be collected, including landfill type, landfill cell, parameter(s) sampled, identification of chain-of-custody, and laboratory results. The change is posted in the Federal Register and becomes promptly available as a hard copy (paper) and electronically, on the Internet.

The invention begins tracking change using one or more intelligent agents ("IA's"). An "intelligent agent" is a specialized program that resides on a network, or at a server as an applet, and can make decisions and perform tasks based on pre-defined rules. Preferably, two or more IA's used by a business will have sufficiently different assignments that at most modest overlap occurs between the IA's. An IA function is part of the Logic Menu, which is discussed subsequently.

A change made to landfill waste regulations is identified by an IA on the Internet, and the relevant change information is routed to a selected metadata table in the invention. The change information includes one or more of five recommendations: (1) create a new WorkList; (2) change one or more data entry forms; (3) create one or more new reports; (4) create a new process; and (5) add one or more new document images. Configuration Users can choose to automatically configure the preceding recommendation based on a set of default conditions, or can manually implement the configuration using a configuration toolkit.

A new WorkList is created manually in a Set Up WorkList function, discussed subsequently, to guide an End User through the tasks involved in recording a sample, tracking the sample through a chain-of-custody, printing a management report of all samples submitted for analysis, preparing and processing a government report, and printing or otherwise distributing the government report on a required government form, or on the Internet, as a document image. No workflow or task management programming is involved in creating the new WorkList. An End User can select the new WorkList in the WorkList function under the File menu and can begin tracking the changing work and tasks.

Figure 3:
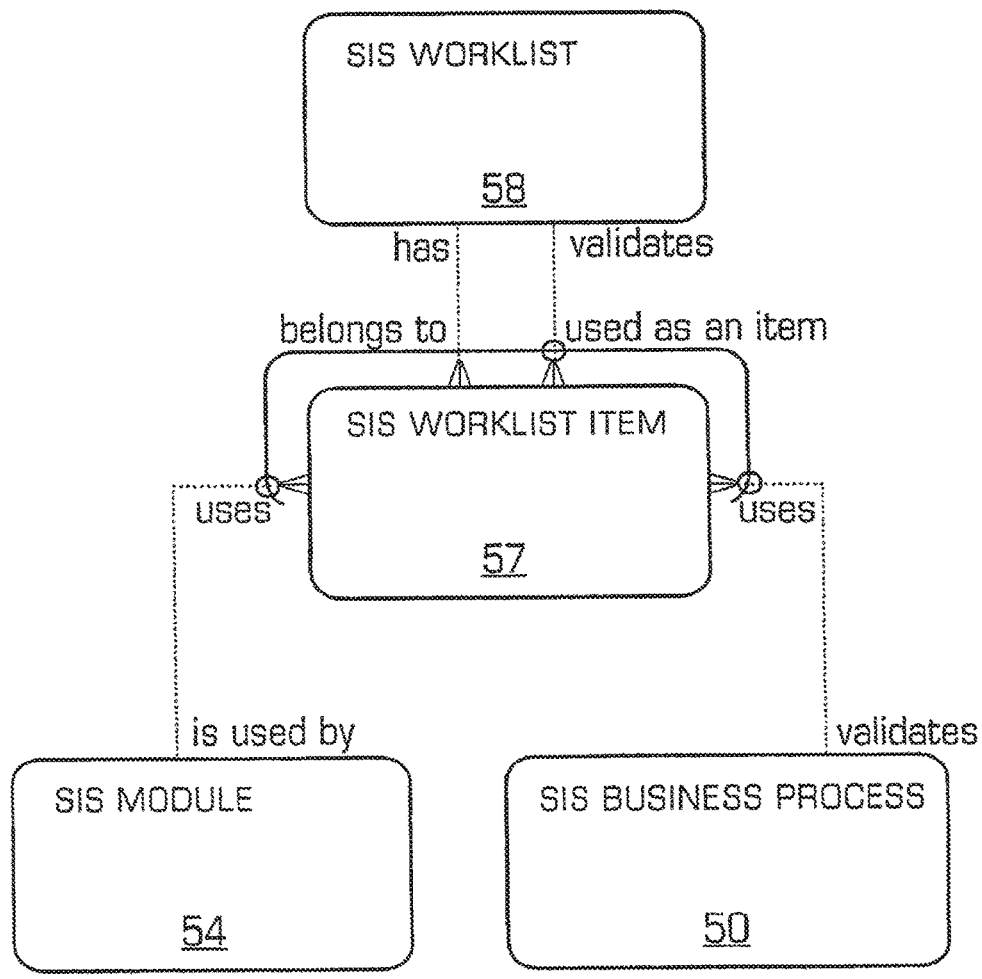
FIGS. 3, 4A, 4B and 5 display metadata tables that are important in operation of the metadata layer.

The WorkList function serves a central role, offering a means for integrating the various data management functions in what can be characterized as a virtual, task-driven menu. The invention provides an integrated user interface with all the functions necessary for managing business data: data entry forms, reports, documents, processes, formulas, etc. The WorkList extends this user interface by allowing users to set up lists of functions in the order that such functions are typically used by an end user. FIG. 3 illustrates the important structures and relationships that allow such implementation. FIG. 3 illustrates how worklist items can include modules (data entry forms, reports and documents), processes and subworklists. A user can create its own task-driven menu and adapt rapidly to change(s) and minimize or eliminate the cost of (re)programming.

A change to a data entry form is accomplished automatically, using default assumptions. A Configuration User can automatically launch the configuration process from the Change Log, adding two new fields to the Waste Sample form, for 'Landfill Type' and 'Landfill Cell.' No forms (re)programming is required in adding the two new fields to the Waste Sample form. An End User sees these changes to the form(s) the next time one of the Waste Sample forms is opened in the Data Entry Form under the File Menu.

A new Report is created automatically, using the View Builder and the Report Builder functions to track all samples sent for analysis, sample status and sample turn-around time. The Configuration User uses View Builder to join and create new views and sample reporting tables, such as Samples, Laboratory_Samples and Sample_Status. The Configuration User uses Report Builder to sequence the fields in the report, specify desired fonts, and create a title for the report. No report (re)programming is required in creating the view or report. An End User can select and print the new report within the Report function.

A new process is created manually, using the Advanced Query Builder and Set Up Processing functions. The new process may determine which samples contain contaminants with levels above a regulatory limit or threshold. The Configuration User uses the Advanced Query Builder to create a view that joins Sample_Results and Regulatory_List_Results and contains logic for comparing one value to another. The Set Up Processing function defines the new view as a process that can be scheduled and that will return results each time the function is executed or launched. No SQL, PL/SQL or other type of (re)programming is required to create the new view or process. An End User can select, schedule and execute the new process using the Process function in the Logic Menu.

A document image is created manually in the Document Builder function to provide regulatory report data on the required government form. The Configuration User imports the image from the Internet and maps the fields on the form to columns in a database. No (re)programming is required in mapping the document(s) to the database. An End User can select the Document Image function from the File Menu and visually examine the results of the report process on the government form.

The system uses a standard interface, a part of the invention, that is based on a multi-tier, server-based, Web-enabled computing model that does not require (re)programming to respond to changes in the received data. A system created using the invention is dependent upon, and driven by, the supporting metadata. The metadata describes the various system components, using a business-like terminology, and replaces the front-end or desktop portion of a user interface. Three main components of the interface portion of the invention are a Web server, a database server and a Java-enabled browser that uses TCP/IP or a similar protocol.

A primary requirement of the invention is to allow a reasonably skilled end user to produce a set of relevant data through the interface, without requiring use of a programming or database manipulation language (DBML), such as SQL.

Each of the four layers is discussed in more detail in the following sections.

B. Business Content Layer

The business content layer includes business knowledge, logical designs, physical designs, physical structures, relationships, and data associated with a selected area of business activity. A business area can be a functional field within an organization, such as finance or human resources, or a particular type of business, such as printing or a (specialty) food business, for which business-related data must be accumulated and managed. The business content layer is defined by and referenced in the metadata layer so that the necessary objects, tables, columns, relationships, functions, procedures and data can be read and updated by the Java data management layer. The business content layer may be characterized as a business content database.

C. Metadata Layer

The metadata architecture is created using Oracle or a similar database system. The metadata model has two main components, a business content data dictionary and an application component. The data dictionary describes or defines the data elements of the application system and the business content layer and how a data element is recorded and managed at the database management system (DBMS) level. The application component primarily records procedures for manipulating business information using data entry forms, worklists, processes, documents, reports and business logic.

The most important aspect of the server-based, programming-free model is the system's ability to create, change and (re)configure the application system at one location and to promptly make the modified application system available elsewhere within the enterprise as well. This approach also eliminates the need to write new code or to modify existing code and eliminates the need for (re)compiling and creating executable instructions and updating every affected user's computer within the organization. This approach is implemented using intuitive, user-friendly, dialog-based screens and using small code segments to define business logic.

Figure 4A:
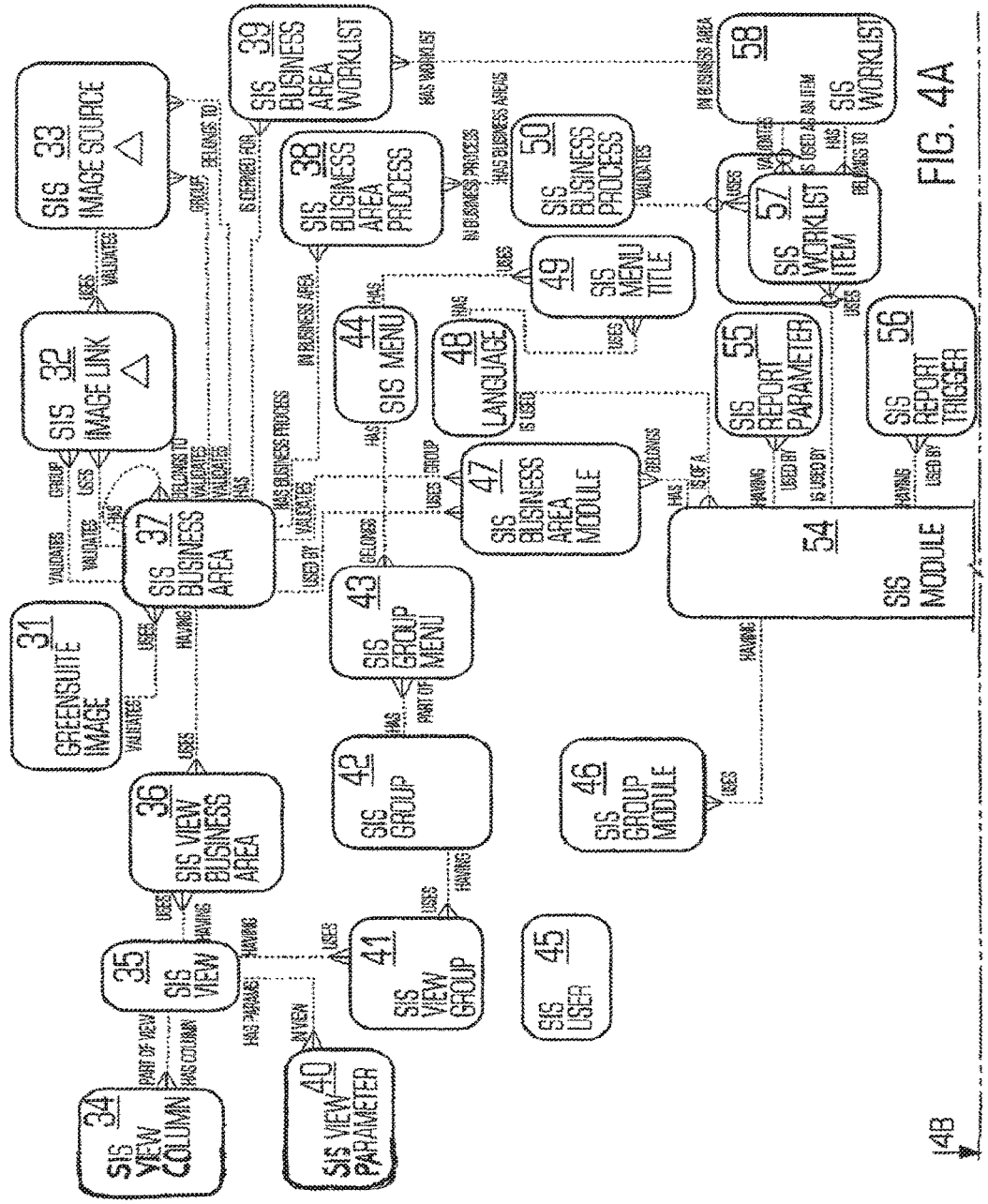
Figure 4B:
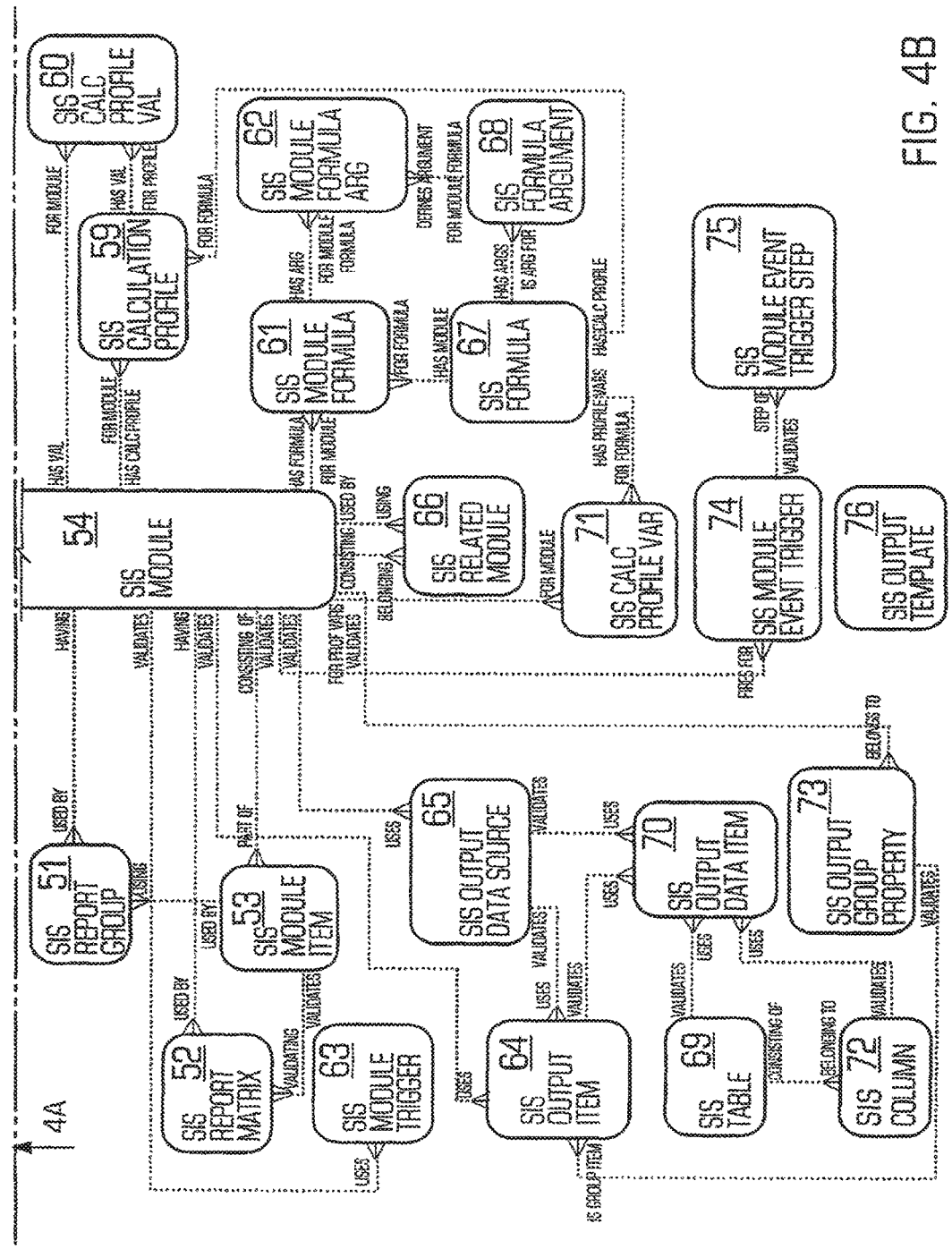
Figure 5:
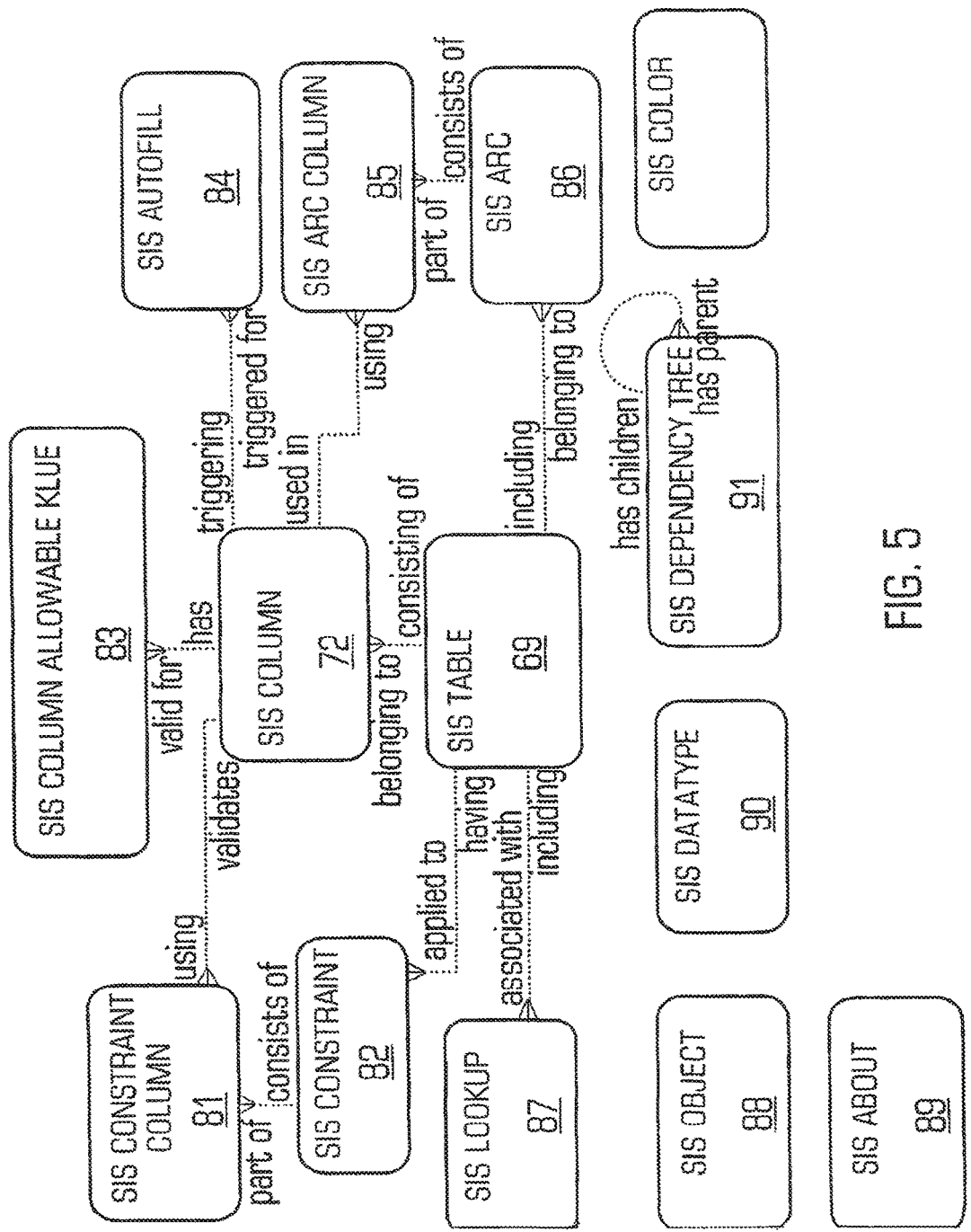

FIGS. 4 and 5 illustrate some of the relationships between several of the metadata tables that are part of the metadata layer. The GreenSuite Image table 31 stores application images for use with menus that are part of the system. The imagelink table 32 records the links between modules and images. The image source table 33 provides image files for use in the system. The View column table 34 holds the columns defined for all views in the system. The View table 35 holds the definition of a "View."

The View Business Area table 36 records information about business area Views in the system. The Business Area table 37 holds the definition of business areas and forms a high level grouping of various business functions that can be implemented using the system. The business process business area table 38 records information about business area processes in the system. The business area worklist table 39 records worklists for the business area. The View parameter table 40 holds the parameters that define all views in the system.

The View group table 41 records information about group Views in the system. The group table 42 holds the various user groups defined in the system. The group menu table 43 stores the menu items that are accessible by user groups. The menu table 44 holds the menu items and their hierarchical structures in the system. The user table 45 holds the user names defined in the system.

The group module table 46 stores the modules that are accessible by user groups in the system. The business area module table 47 records module names for every business area. The language table 48 provides different language definitions for use in the system. The menu title table 49 provides the menu titles for the system. The business process table 50 provides the definitions and business logic of the processes defined within the system, to support reporting activities.

The report group table 51 provides details for the report group. The report matrix table 52 provides the definitions of matrix reports. The module item table 53 provides the definitions and business logic of individual data elements for every data entry form, report and document defined in the system. The module table 54 provides the definition and business logic for all data entry forms, reports and documents created within the system. The report parameter table 55 records the parameters specified for reports in the system.

The report trigger table 56 records the triggers specified for reports in the system. The worklist item table 57 provides definitions of, and links to, modules launched from the worklist. The worklist table 58 provides the definitions and logic for worklists that facilitate work flow for a business activity. The calculation profile table 59 provides the definitions and logic to perform calculations related to data entry forms, for decision making and data input. The calculation profile value table 60 records the calculation profile variable values.

The module formula table 61 provides the formulas used by the modules in the system. The module formula argument table 62 provides the formula arguments used in the module. The module trigger 63 provides the generic triggers specified for modules in the system. The output item table 64 provides details for the document module items. The output data source table 65 provides details for the document module items data source.

The related module table 66 provides the links between modules in the system. The formula table 67 provides the definitions of formulas used in the system. The formula argument table 68 records the arguments for all formulas used in the system. The table 69 maintains all the application table definition details. The output data item table 70 provides details for the document module items.

The calculation profile variable table 71 records the calculation profile variables. The column table 72 records the data elements of every table recorded in the table 69. The output group property table 73 maintains the details of the application table columns. The module event trigger table 74 provides the event triggers specified for modules in the system. The module event trigger step table 75 provides the event trigger steps specified for modules in the system. The output template table 76 provides the document template details.

With reference to FIG. 5, the constraint column table 81 provides individual data elements for the business rules. The constraint table 82 provides the business rules defined at the database level for every table in the application system, together with the meaning of each rule. The column table 72 is characterized in the preceding. The column allowable value table 83 provides the business rules at a data element level. The autofill table 84 records the automatic data transfer setup. The arc column table 85 provides data elements that are part of every usually exclusive relationship in the system. The arc table 86 records the mutually exclusive relationships in the system. The lookup table 87 provides the lookup definitions for every child table in the system. The tablename table 69 is characterized in the preceding. The object table 88 holds the names of the database objects defined in the system. The about table 89 stores versions of, and copyright information concerning, the system. The datatype table 90 provides the datatype definitions throughout the system. The dependency tree table 91 provides the application and database hierarchy (ies). The color table 92 provides the color definitions for use in various tools.

D. Java Data Management Layer

The Java format is chosen as the basis for the data management layer because Java is an object-oriented language that is powerful, flexible, easily learned, multi-threaded, portable, and distributable over a network through use of a browser.

When an object-oriented language (OOL) is employed, once a particular kind of activity has been programmed for an object, that behavior can be shared with other like objects, rather than being reprogrammed each time a new like object is introduced. A future program or activity can "inherit" code from a program that presently exists so that code becomes reusable. One result of this is reduced (re)programming time and code debugging time.

Java is powerful, in part because of the class libraries provided in the language. For example, a programmer who wishes to place a special button on a screen can use qualities of a button provided with the Java Abstract Window Toolkit, then add behavior to perform specific tasks. Java is also more easily learned than its closest predecessor, C++. Although much of the syntax of Java and C++ is the same, a Java programmer doesn't have to deal with pointers and memory allocation, two onerous features that are part of programming with C++.

Java, because it is multi-threaded, can handle two or more tasks simultaneously. For example, building part of a screen, displaying the part of the screen, and pursuing the remainder of the screen-building activity in a background thread gives an end user the impression that the screen is quickly ready for use.

A Java program, once written, can be run on any platform having a Java interpreter so that Java is portable. Because compilation of a Java program generates "bytecode", not machine-specific runtime code, recompilation is not necessary when moving from one platform to another. The major browsers, Netscape Navigator and Internet Explorer, include a Java interpreter so that a user of those browsers can run Java code.

Traditional client-server applications require upgrades to a client machine whenever code changes are implemented, a daunting task in a large network. Where Java applets are used, code is downloaded at runtime, insuring that the client has the most recent version of the code. This allows easy deployment of Java code over the Internet, or over an intranet of an organization. The Java security model prevents unauthorized tampering with the client machine using non-authenticated code. By using Java, the invention disclosed here also becomes platform-independent, portable, secure and easy to deploy over a suitable network, such as the Internet. A more extensive discussion of Java is available at http//:www.javasoft.com.

The Java data management layer of the system provides a graphical user interface for both the metadata layer and the business content layer, which allows a web browser user to communicate with the metadata and business content layers on a server from anywhere in the world.

No part of the Java data management layer is programmed for specific business content. Each procedure used by an end user is, or can be, tailored for specific business content and for specific user roles. The end user's system may be (re)configured without programming and may be maintained without programming.

The user interface is generated by the interpretation of the metadata layer delivered to the Java data management layer. The relationship between the business content layer and the Java data management layer may be characterized as a "data mapping," with no hard-wired coding as is typical in a conventional program. "Data mapping," as used here, refers to a mechanism that provides a correspondence between an item in a graphical user interface (GUI) and an item to be changed in the business content layer.

The Java data management layer and thus what the end user sees is defined only by the metadata and is generated as needed by a single program that interprets what a form will look like. Flexibility is maintained by having no hard-wired connection between code and the business content layer.

In a similar manner, reports and other output documents exist only in the metadata created through the Java data management layer. These output documents are produced by interpreting the metadata and by extracting data from the particular business content chosen. Events may be set up based on one or more changes in the business content data, but processing of an event depends on metadata that defines the event. Processing steps can be created to summarize and "filter" data, depending upon the metadata defining the summarization and filtering techniques. Data can be imported from, and exported to, other systems based on metadata definitions of data structures.

With reference to inputs, outputs, processing and events, the metadata defines how the system should respond. The metadata can also be changed by an advanced user. Normal programming steps are decomposed into pieces that can be combined by a non-programmer into a coherent set of procedures that define a unique system.

Using the Java data management layer, an end user can enter data into the business content layer using forms tailored to the user's specific task(s). The end user sees specific menus, forms and reports that pertain to the user's work. Alerts, based on selected trigger conditions, are received by e-mail or screen messaging, reminding the user of tasks to be performed, relevant training and relevant events that have occurred. An end user cannot affect the business content layer, except in assigned areas, so that data are secure while being accumulated. A user located in a remote site, connected by telephone or though the Internet, can provide input information for a company's system using the Java data management layer.

A manager who uses the system can see high-level, cumulative data concerning a relevant area in the business content layer and can move to the level of detail needed for the task at hand, including charts and graphs accumulated over time for monitoring a business area. Through event management, a business can be alerted, by e-mail, facsimile or screen message, to trends that are especially relevant to that business area.

The Java data management layer and the metadata layer together serve as a standard interface system that is positioned "on top of" one or more databases, allowing addition, deletion and modification of data entry forms, tables, views, images, reports, queries, information processing and logic, monitoring or work flow and distribution and routing, menu presentations and provision of regulatory or non-regulatory alerts. Substantially all of the data entry and modification, report monitoring and preparation, and other monitoring processes are transparent so that the user need not be a computer programmer to deal with changes that occur from time to time.

E. Change Management Layer

The change layer primarily involves an intranet or the Internet and uses one or more intelligent agents (IA's) that continually search on the Web for relevant changes in a selected business area. The changes may be regulatory and/or non-regulatory, and each IA is defined by rules and constraints that focus on the selected business area. When an IA discovers a relevant change, the IA obtains all available information concerning this change and delivers this information to the Java data management layer. A user may configure the system to apply pre-defined rules to the change in order to determine whether the change information delivered by the IA will be accepted and acted upon by the Java data management layer. Alternatively, the user may decide manually (or manually override the pre-defined rules) whether the delivered change information will be accepted and acted upon, or ignored.

Assume that a data entry form is to be created based on the Department Table of the invention. FIG. 6 is a flow chart showing the steps used to accomplish this. In step 101, the Form Builder function is launched from the Tools Menu. In step 103, the form is given a name, and the Department Table is selected as the base table. In step 105, one or more fields are chosen for incorporation in the data entry form, and the form is uploaded to the network. A maximum of three steps is required to create a data entry form using the invention. The data entry form and its definition may be assumed to be bug-free, because the underlying Form Builder has been thoroughly tested and confirmed to generate the correct metadata definition of the desired form.

This approach should be compared with the flow chart in FIG. 7, showing the procedure for creating the same data entry form in a conventional language-based development environment. In step 111, the language-based environment development tool is invoked. In step 113, the program code is written and debugged. The program is compiled, in step 115, and an executable is generated, in step 117. In step 119, the executable is placed in the appropriate directory on all user desktops in the organization. Additional steps are required to create a new data entry form, using a conventional approach, and steps 113 and 115 should be represented as a loop, because it is unlikely that the new program code will compile and run the first time.

The invention is preferably implemented in software and, as noted in the preceding, has been reduced to practice using a Java programming language and using a relational database system such as Oracle to create links between the different components of the software package. In one embodiment, the system is expressed as seven interacting menus (File, Logic, Distribution, Data, Tools, Administration and Help), each with supporting functions, in the following format and with the following functions I. File Menu
  A. WorkList
    1. WorkMap
    2. WorkCalendar
    3. WorkChat
    4. WorkList Help
  B. Data Entry Forms
    1. Image/URL
    2. Video/Audio
    3. Form Report
    4. Copy Record
    5. Archive Record
    6. Find Data
    7. Calculate Record
    8. Form Help
    9. Grid Data Entry
    10. Related Forms
  C. Report
    1. Process
    2. Edit
    3. Preview
    4. Report Print
    5. Report Send
  D. Program
  E. Favorites
  F. Find
II. Logic Menu
  A. Calculator
  B. Process
    1. Run Process
    2. Schedule Process
  C. Intelligent Agent
  D. Graph/Chart
III. Distribution Menu
  A. Alert Messaging
    1. Alert History
    2. Conditional Alerts
  B. Send To
  C. EDI
IV. Data Menu
  A. Import
  B. Export
  C. Archive
  D. Copy
  WebLinks
V. Tools Menu
  A. New Form Builder
  B. Edit Form
    1. Form Properties
    2. Link To
    3. Item Properties
    4. Display Items
    5. Formula Items
  C. Edit Form Items
  D. Event Builder
  E. Report Builder
  F. Document Builder
  G. Delete Module
  H. Formula Builder
  I. View Builder
  J. Advanced Query Builder
  K. Intelligent Agent Builder
  L. Set Up Processing
  M. Set Up WorkList
  N. Maintain Parameters
VI. Administration Menu
  A. Set Up Distribution
  B. Maintain Distribution Groups
  C. Maintain Menu
  D. Maintain Server Process
  E. Security
  F. Change Password
  G. Maintain Functional Versions
VII. Help Menu
  A. Help System
  B. Help Desk
  C. About Change Agent System Content and purpose of these functions are discussed in the following.

I. File Menu

A. User WorkList is a task-driven function that a user creates to support the user's own internal business processes. WorkList is integrated with other functions in the framework and can be used to launch entry forms, reports, processes, tools, URLs, Web pages and external programs. The integrated function of WorkList include the following.

1. WorkMap is an integrated business process management and routing function that implements user tracking of the status of a task, receipt of new tasks, and routing of tasks to other users. WorkList can be viewed as a workflow activity by enabling the WorkMap option. WorkMap data can be viewed on-line, printed, or transmitted using e-mail and facsimile.

2. WorkCalendar provides an integrated calendar view, by day, week, month, calendar quarter, calendar half or year, of all tasks in a work flow activity, of a work flow activity in a graphical format. Calendar information can be viewed on-line, printed or transmitted by e-mail and facsimile.

3. WorkChat is an integrated on-line chat function, allowing a user to select a chat channel and to work privately or with a selected group to solve task-related problems.

4. WorkList Help is an integrated function providing amplifying information concerning an activity or requirement.

B. Data Entry Form implements manual data entry into the system, as well as querying, calculating with and analyzing entered data. Data Entry Form provides function for navigating to attached images, to Web page URLs and to subsidiary forms. The integrated function of Data Entry Form include the following.

1. Image/URL implements attachment of document images and Web page URLs ("Images") to business records. A user can open an Image, view the Image on-line, print the Image and transmit the Image by e-mail and facsimile.

2. Video/Audio implements attachment of video and audio clips to business records. A user can launch a video or audio image, print video images, and send video and audio clips by e-mail and facsimile.

3. Form Report implements creation of one or more reports from a base table(s) used by the form. A user can preview, print and send a reports by e-mail and facsimile.

4. Copy Record implements copying data from one record to another. A user can create multiple copies and can copy a record from a child record by selecting the relevant table(s) and column(s) to be copied.

5. Archive Record implements archiving, de-archiving, purging and viewing of one or more records.

6. Find Data implements finding of one or more records based on parent-child relationships. A user can search for and view a record by entering an "or like" condition for any column in any parent or child table.

7. Calculate Record attaches pre-defined mathematical formula (s) to a form and calculation of results using the formula (s). A user can map formula arguments (variables, parameters) to tables and columns in a database, read in transaction data imported from external systems, set up data profiles to reduce data entry, and enable creation of new records based on calculated results. Results can be graphed, printed or transmitted by e-mail and facsimile.

8. Form Help provides form and field level help on-line.

9. Grid Data Entry implements querying and editing of records in a grid or spreadsheet-style interface. A user can transmit grid data by e-mail and facsimile.

10. Related Forms implements launching of a sub-form or related form from a master form.

C. Report implements viewing, printing and transmitting data based on pre-defined business requirements. Data are provided to a user in the most useful format for that user. A data report can be in tabular format, with column(s) displayed horizontally, in columnar format, with data displayed vertically, or in document format, with data inserted on top of, or associated with, regulatory form images. Indeed, this association is a key feature of the invention. A report function includes the following features.

1. Process implements processing the results of the report. This feature is used for more complicated reports, where logic or multiple data sources (Tables, Views, etc.) may be involved. A user can define one or more parameters, such as location, date or period, to filter the results of the process.

2. Edit implements user editing of a report, either directly or through selection and use of data entry forms supporting the report.

3. Preview implements previewing report results in tabular, columnar and document formats. A user can also scroll through multiple pages and rows. A graph, attached to a report, can also be previewed.

4. Report Print implements printing the results, and any associated graphs and other attachments, of a report.

I. Report Send implements transmission of a report, including graphs and other attachments, by e-mail and facsimile.

II. Logic Menu

A. Calculator implements calculation of results using pre-defined formulas. A user can enter values for formula arguments, calculate results, view the results on-line, print the results and transmit the results by e-mail and facsimile.

B. Process is a menu for the following process features.

1. Run Process implements processing of results for a report and analysis tasks, such as statistical analysis of data. This function is used for more complicated reports, where logic or multiple data sources (tables, views, etc.) may be involved. A user can define one or more parameters, such as location, date or period, to filter the results of the process, can export result data, and can open reports that are based on the result data.

2. Schedule Process implements launching of one or more intelligent agents and background processes. This function implements scheduling of processes (e.g., reporting) in advance, in order to limit disruptions that can occur in normal system operations.

C. Intelligent Agent launches one or more intelligent agents (IAs) to pursue internal and external Web activities. An "intelligent agent" is a specialized program that makes decisions and performs tasks based on predefined rules and objectives. An IA can be used to identify changes in laws, statutes, ordinances, regulations and related issues, changes in technical requirements, to provide feedback, and to perform Change Configuration tasks.

D. Graph/Chart implements opening of a graph or chart, based on a pre-defined data set, to provide line, bar, pie, stacked area charts and other charting formats. A user can manually manipulate depth, rotation and elevation of graph and chart results, can print the results and can transmit the results by e-mail and facsimile.

III. Distribution Menu

A. Alert Messaging implements transmission of alert messages by screen, pager, e-mail and facsimile. A user selects an alert mode, specifies an expiration date and time, selects one or more recipients, selects manual/send for the alert, views an alert history and/or sets up one or more alert conditions that will automatically trigger the sending of an alert. Alert Messaging includes the following function.

1. Alert History implements viewing of one or more alerts that have been transmitted, according to content, recipient(s), sender, date and time of transmission, message and other relevant criteria.

2. Conditional Alert implements setup of automatically triggered (as distinguished from manually triggered) alert conditions, according to alert mode, description of triggering event, message, recipient(s) and conditional logic.

B. Send To implements transmission of documents and associated images through e-mail and facsimile. A user can select a document to be sent, mode of transmission, recipient(s), and the return pager number for confirmation. A user can look up distributions of historic documents by specifying document name, recipient(s), sender, date and time of transmission, message and other relevant criteria.

C. EDI implements transmission of data by electronic data exchange (EDI). A user can specify transaction data being sent, recipient(s), other information describing the transaction, and can then transmit the data.

IV. Data Menu

A. Import implements importation of data from external files. A user can select files for import, select tables as import destination(s), define delimiters and text qualifiers, separate fixed width columns, map external file fields to database columns, define lookup conditions, parse conditions, check for errors and import data.

B. Export implements export of data to external files. A user select's the file(s) to be exported, the table(s) to be exported, the delimiter and text qualifier, sets up file and column properties, checks for errors and exports the file.

C. Archive implements archiving, de-archiving and purging of data. A user can enable or disable an archive, recover archived data, purge data, recover archived data and create snapshots of archived data.

D. Copy implements copying of one or more records within a table. A user can create single of multiple copies and copy data from child records by selecting relevant tables and columns to be copied.

E. WebLinks opens and attaches Web page links to a master Web page. A user can select, attach, order, remove and launch a Web page from the master Web page.

V. Tools Menu

A. New Form Builder implements creation of new data entry forms, using a change configuration function. A user can assign one or more new forms to a business area and group, specify the form name, select base tables, select columns, create and display formula columns, format columns and save the new form.

B. Edit Form implements editing or otherwise changing an existing form, using a change configuration function. A user can select a form, make changes to a form, save the changes, The Edit Form module includes the following functions.

1. Form properties change of form level (as distinguished from field level) properties. A user can change a form layout, change the query filter condition and specify restrictions on global queries.

2. Link To links related forms to a specified form so that the related forms can be launched from Data Entry Form. Here, child forms are linked to a parent form.

3. Item Properties allows a user to change field level (as distinguished from form level) properties. A user can change the field label, display width, sequence, list of values, lookup form (a form that is edited for a foreign key column) and other relevant properties.

4. Display Items implements addition of display-only fields to a form. A display field can be based on columns from other tables, including tables that are twice removed from the form's base table.

5. Formula Item adds formulas to existing tables and display-only fields.

C. Edit Form Item implements editing of form fields. A spreadsheet format allows a user to easily re-sequence and edit data for single or multiple fields.

D. Event Builder implements attachment of form level and database triggers to data entry forms E. Report Builder is a change configuration function for building reports based on tables and views (joins of multiple tables).

F. Document Builder is a change configuration function for mapping documents, such as regulatory forms, onto to database columns for reports.

G. Delete Module is a change configuration function for deleting data entry forms, reports, processes and worklists.

H. Formula Builder is a change configuration function for creating formulas, including complex, nested equations.

I. View Builder is a change configuration function for creating views for use in reports.

J. Advanced Query Builder is a change configuration function for creating more sophisticated queries and views.

K. Intelligent Agent Builder is a change configuration function for specifying or modifying rules and objectives to be used by an Intelligent Agent to be launched.

L. Set Up Processing is a change configuration function for creating computational processes using one or more views.

M. Set Up Work List is a change configuration function for setting up task-driven menus based on data entry forms, reports, processes, subworklists, tools, Web pages and external programs.

N. Maintain Parameters is a change configuration function for creating and maintaining parameters for use in filtering reports.

VI. Administration Menu

A. Set Up Distribution implements setting up users, printers, facsimile machines, pagers and other distribution instruments.

B. Maintain Distribution Groups creates distribution groups and assigns users to these groups.

C. Maintain Menu maintains the system menu, including the menu picks, language, color schemes and other relevant properties.

D. Maintain Server Processes implements connecting to and initiating server-side processes, such as e-mail, facsimile, pager and GIS processes.

E. Security implements setting up user groups, system privileges, database privileges and other relevant security activities.

F. Change Password implements changing of user passwords.

G. Maintain Functional Versions compares and manages data associated with functional versions, including changes to data entry forms, views, reports, processes and worklists.

VII. Help Menu

A. Help System provides context-sensitive technical and functional help.

B. Help Desk manages internal and user-related issues.

C. About Change Agent System describes the regulatory change system, including system version information.

The system provides a "business application browser" that combines Web browser technology with a selected set of business application items that are common to the tasks to be performed to implement information management for a given business area or requirement, including common functions such as work/task management, data entry, reporting, data processing and analysis, data presentation (printing, electronic display, distribution, etc.), and report and document preparation.

The invention thus combines the connectivity of a Web browser with the data management tools for a selected business activity. Because the system is, or may be arranged to be, accessed and used through an Internet connection, the system is not limited to stand-alone or local applications. A business with activity sites throughout the world can be connected as easily as a group of contiguous sites. The system allows a business to use the normal business skills of their employees and does not require that every employee become a programmer in order to continue to respond to regulatory and/or technological and/or social changes affecting business operations and/or information management requirements.

As examples of applications which are enabled by the invention, an EH&S system and an FDCMTD system are developed and discussed subsequently.

In the EH&S area, for example, the business content layer in one embodiment may include seven sections that communicate with each other through a mechanism that integrates these sections:

(1) product stewardship, including product information, ecological and toxicological studies, allegations/inquiries tracking, MSDS management and materials and waste labeling;

(2) incident tracking and prevention, including emergency management, incident tracking and process safety;

(3) personnel health and safety, including personnel demographics, personnel training, safety, injuries and illnesses, industrial hygiene and occupational medicine;

(4) hazardous materials and waste, including hazardous materials, waste tracking, pollution prevention and site remediation;

(5) environmental releases, including air emissions, water discharges, soil and groundwater discharges and toxic chemical releases;

(6) regulatory requirements, including audits, regulatory lists, regulatory issues, requirements and litigation;

(7) facilities management, including physical and organizational structures, company information, equipment tracking and process and operations information; and (8) tools that allow one to implement the EH&S functionality.

In an area such as food, drugs, cosmetics, and medical treatments and devices ("FDCMTD"), a business content layer may include activities or objects in one or more of the following seven areas and implement communication between the areas:

(1) foods, food additives, prohibited food additives, animal feeds, labeling, packaging, testing on animals and humans, unavoidable contaminants, nutritional guidelines, dietary supplements, irradiated foods;

(2) drugs and pharmaceuticals, advertising, labeling, packaging, prescription forms and orders, drug names, interpretative statements and warnings, bioavailability and bioequivalence, controlled substances, controlled substance schedules, narcotic treatment drugs, medicated foods and feeds, over-the-counter drugs, applications for FDA approval of new and modified drugs;

(3) animal drugs and feeds, labeling, packaging, unavoidable contaminants, oral, implantable, injectable, ophthalmic, topical and intramammary dosages, tolerances, feed additives, feed irradiation, prohibited substances;

(4) cosmetics, labeling voluntary registration and filing of ingredients, warning statements;

(5) biologics, registration and product listing, use of blood and blood components, diagnostic substances;

(6) radiological treatments and devices, records and reports, notification of defects, repurchase, repair and replacement of electronic products, import controls, performance standards for electronic products, ionizing radiation emitting products, microwave and radiofrequency emitting products, light emitting products and sonic/infrasonic/ultrasonic radiation emitting products; and (7) medical devices, clinical chemistry and toxicology devices, labeling, device corrections and removals, recalls, premarketing approval, tracking and classification of devices, exemptions, cigarettes and smokeless tobacco, banned devices.

These areas are complemented by tools that allow one to implement the FDCMTD functionality.

In connection with FDCMTD activities, the primary considerations may include: (1) which FDCMTD items are now part of inventory, and which FDCMTD items need to be replenished; (2) by what other names, if any, is an FDCMTD item known in the trade; (3) what restrictions on labeling and/or packaging of an FDCMTD item are imposed; (4) what restrictions, if any, are imposed on animal testing of each FDCMTD item; (5) are test results for an FDCMTD item presently being evaluated by a federal or state agency (e.g., the FDA or the NRC); (6) does dispensing of a particular FDCMTD item require licensing or certification of the distributor by a federal or state agency; (7) what are the expiration dates, if any, for each FDCMTD item in inventory; (8) what are the restrictions, if any, on use, dermatological application or ingestion of each FDCMTD item in inventory; (9) which FDCMTD items, if any, are considered experimental and may not be distributed to any recipients without restriction; (10) which FDCMTD items require presentation of a properly executed restriction form before the item can be dispensed; and (11) which FDCMTD items are subject to control by a federal or state government. These and related questions are incorporated in data entry forms, analysis result forms, report and other document forms, and distribution forms for a business area that includes part or all of the activities that involve one or more FDCMTD items.

A similar integrated set of sections can be developed in any of the other regulated areas to which one or more of the Codes of Federal Regulations applies, or selected areas of non-regulatory change in a business activity. The system uses the four interacting software layers (change, Java data management, metadata and business content), discussed in the preceding, and may include an array of pre-defined document forms, report forms, data entry forms, formulas and calculations that are most likely to be needed in that business activity. These pre-defined forms and analytical procedures are changed or supplemented to meet the relevant regulatory and non-regulatory changes that are identified by one or more Intelligent Agents that reside on a network, such as the Internet, and that are identified and entered manually by individual users. System functionality can be extended by importing related analytical techniques, such as geographic information systems capability, and by use of internet links to expand the flexibility of the system.

An EH&S system that implements the invention in one embodiment includes eight sections, illustrated in an example shown in FIGS. 8-19. Each E&S section has several functional modules that are responsible for different activities associated with tracking and creating reports on related activities and for providing links between the different modules in the same section and/or in another section. The sections and the input data and output data for these sections are as follows.

I. Product Stewardship
Input data:
material/chemical information
product information
MSDS management product labeling
ecology/toxicology studies
pesticide information
computer usage tracking
allegations/inquiries tracking
Output data:
material technical sheets
vendor/outbound ANSI MSDS information
products, products-in-process and waste labels
risk assessment studies
FIFRA labels and reports
TSCA labels and reports
customer usage surveys
allegation/inquiry reports
II. Incident Tracking and Prevention
Input data:
emergency management
incident tracking
material/waste spills
near-miss tracking
hazards analysis and modeling
workplace safety
process safety management (PSM)
Output data:
emergency plans
emergency resources and mutual aid
incident notifications and agency reports
safety inspection reports
safety audit reports management of change reports
PSM and project review reports
III. Personnel Health and Safety
Input data:
personnel information
personnel demographics
training plans
injury and illness tracking
workers compensation and disability events
industrial hygiene (IH)
occupational medicine epidemiological trend analysis
Output data:
personnel profiles and histories
personnel locations and personnel protection equipment (PPE) use
training reports
OSHA and internal injury/illness reports
workers compensation and disability reports
IH monitoring, plans and reports
medical screening reports epidemiological studies
IV. Hazardous Materials and Waste
Input data:
materials management
shelf life tracking
waste stream information
waste manifesting
waste accumulation and storage
on-site waste treatment and disposal
hazmat and waste labeling
pollution prevention
site remediation
Output data:
SARA state/local inventory reports
shelf life reports
vendor and internal waste profiles
manifests, LDR and exception reports
EPA hazardous waste reports
waste facility permit applications
NFPA/HMIS waste labels
waste minimization reports
V. Environmental Releases
Input data:
air emissions
water discharges
leak detection and repair
emission reduction credits
soil discharge and stormwater monitoring
groundwater and water quality
toxic chemical releases
permit management
permit conditions and exceedence monitoring
Output data:
air emission inventory and fee reports
LDAR reports
emission reduction reports
discharge monitoring reports
groundwater sampling reports
toxic release inventory reports
permit applications and compliance reports
exceedence reports
VI. Regulatory Requirements
Input data:
environmental audits
inspections
requirements management
regulatory issue tracking
compliance and corrective action plans
legislation tracking
regulations
regulatory list management
Output data:
audit reports
inspection reports
requirements reports
company and site issue reports
corrective action plan reports
legislative action reports
regulation profiles
regulatory list tracking
VII. Facilities Management
Input data:
site physical information
site organization information
customer and vendor information
process information
equipment/training information
project and task management
sample tracking
EH&S cost tracking
enterprise reference data
Output data:
site profile reports
customer and vendor reports
process history and operations reports
equipment/training reports
project and task reports
sampling and COC reports
EH&S cost reports
enterprise data lists
VIII. Tools:
data entry form creation
data import/export
custom fields
custom processing
report creation
output from report creation document creation
query/data view creation
print. facsimile, e-mail paging
alert rules and messaging
imaging
geographic information systems
task management and work flow
on-line help
archiving security The Product Stewardship section includes databases that provide relevant information on chemical and physical properties of materials used at a facility, product handling information, ordinary and special hazards associated with a material consumed, processed and/or produced at the facility, and environmental health and safety (EH&S) assessments. This section can create a Materials Safety Data Sheet (MSDS) in a plurality of languages, using pre-set phrases linked to the EH&S assessments, and the MSDS can be distributed to selected recipients using the system's MSDS distribution system (facsimile, e-mail, hard copy, etc.). This section permits a user to perform life cycle analyses on selected materials. MSDS image files can be created and stored within the system and/or can be converted to an ANSI standard 16-section format for HAZCOM viewing. A user can also create HAZCOM warning labels that comply with NFPA and HMIS requirements. This section also tracks material imports and exports, as well as pre-manufacture notifications, ecology-toxicity studies, allegations received concerning discharges, and inquiries concerning manufactured chemicals. This section also provides for pesticide reporting under FIFRA.

The Incident Tracking and Prevention section captures and accumulates information on all environmental releases and discharges and all injuries and illnesses at the facility. This section includes a listing of incident command structures, listings of qualified emergency response personnel, responsibilities for emergency responders and emergency procedures, including checklists. This section identifies hazards associated with, and emergency response information for, materials that may be released. A Geographic Information System (GIS) tool is included that can be used to graphically display incident information, locations of nearby toxic, reactive, ignitable and/or corrosive chemicals and of the closest emergency response equipment. This section provides agency reportability determination for SARA and CERCLA releases and provides follow-up notifications for the appropriate agencies. Associated statistical tools allow statistical analysis of incidents to identify possible trends. Environmental releases, permit excursions, injuries and illnesses at the facility can be accumulated for a selected division or facility or for an entire enterprise to create reports for SARA, OSHA and internal reporting requirements. Incidents that result in workers compensation issues and/or in risk management issues can also be identified and tracked.

The Personnel Health and Safety section is the main repository of employee information and allows scheduling, monitoring and tracking of events involving industrial hygiene, safety and/or occupational medicine. All types of industrial health surveys are supported, including chemical, noise, heat stress, radiation and ergonomics. Results of occupational medicine examinations, including physical exams, health history questionnaires, respirator fit tests, EKG exams, audiometric exams, pulmonary function tests, vision tests, x-ray exams and drug screening, can be accumulated and analyzed. This section captures and accumulates employee demographics, primary and secondary job classifications, job activities, and employment histories. This section is integrated with other sections to create process surveys and analysis plans for exposure groups that can be selected by industrial hygiene and safety personnel. This section aids in identification of training needs associated with a job, a location or a regulatory requirement. Groups of persons that need particular training can be identified, and content of appropriate training courses and follow-up courses can be determined. Costs associated with all examinations and training activities can be captured and examined.

The Hazardous Materials and Waste section tracks a material's arrival at the facility, the maximum quantity stored, distribution and use of material at the facility, movement, and consumption and disposal of material at the facility. Material tracking provides information to support SARA notifications and release reporting and allows a user to generate waste profiles, hazardous waste manifests and related DOT shipping information. This section maintains a library of previous manifests, tracks the status of manifest copies, and captures and notes discrepancies and modifications, if any, vis-a-vis an earlier manifest. The manifest information, once created, is rolled up to produce RCRA state and federal waste summary reports. This section also provides for authorization, stocking, inventorying and re-ordering of material to ensure that required materials are always available. Pollution prevention projects, source reductions, waste minimization and waste tracking against user goals can be implemented within this section to meet internal and/or external targets. The section provides mass and energy balance tracking for selected processes and/or selected equipment.

The Environmental Release section captures necessary data to create agency reports of releases to air, water or other liquids, and land. Air release information can be captured for Title V requirements, risk management plans, air emissions inventory summaries, and leak detection and repair programs. This section captures multimedia permit requirements for air, effluent discharges, stormwater, water quality and waste facility permits. Permit dates and imposed conditions can be monitored using automatic screen alerts or e-mail messages. Tracking of calibration events, samples, analysis requests and laboratory reports are implementable within this section.

The Regulatory Requirements section provides additional tools that are useful in implementing and managing EH&S compliance, including identification of all internal and external requirements in order that the facility be allowed to operate. This section also identifies who is responsible for compliance with a particular requirement. This section can be used to determine if, and how, proposed regulations will affect facility operations by providing access to material, equipment and process information to which the regulations may be applied. Reference information, such as checklists and current regulations, are available through this section or by use of links to Internet data sources. Compliance documents, interpretations, procedures and work plans can be stored and shared with all affected persons and organizational units. The status of work plans, tasks and activities can be tracked and reported. Audit scheduling, audit findings and corrective actions scheduled and implemented can be identified and reported to provide feedback on the effectiveness of the facility's compliance program. This section provides an effective tool for designing and implementing an ISO 14000 compliance program for a facility.

The Facilities Management section is a cross-functional sub-system that maintains site-specific and enterprise data. This section captures geographic information, organizational structures, equipment specifications, operating information, calibration requirements, maintenance schedules, vendor information and user-defined checklists. This section also captures relevant process information and data, site disposal activities, products manufactured, unit operations, and simulation of process scenarios and recipe information. A user can profile land use wildlife resources and cultural resources present, and sensitivity of selected receptors. This information can be presented spatially, if desired, using the GIS capability.

Figure 8:
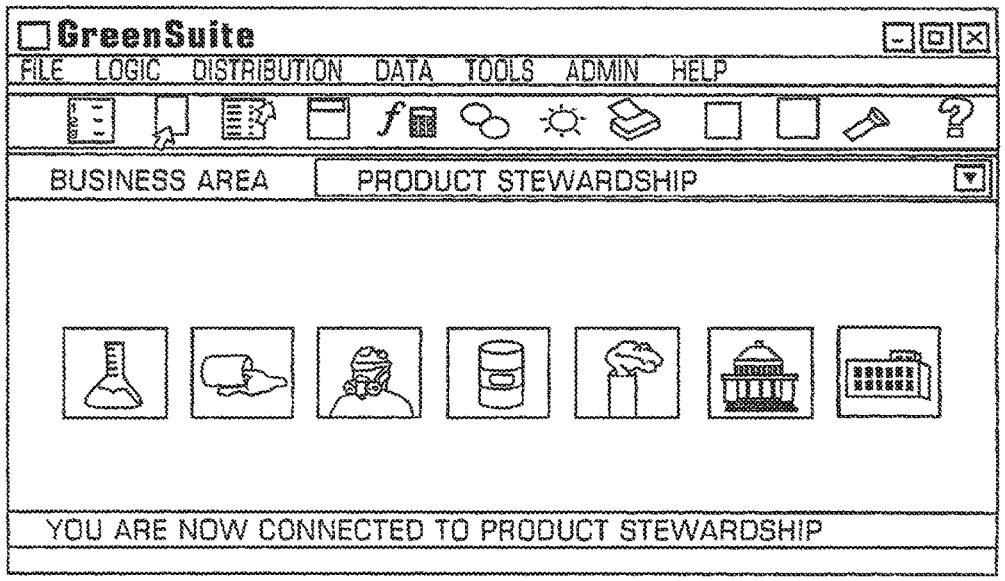
Figure 9:
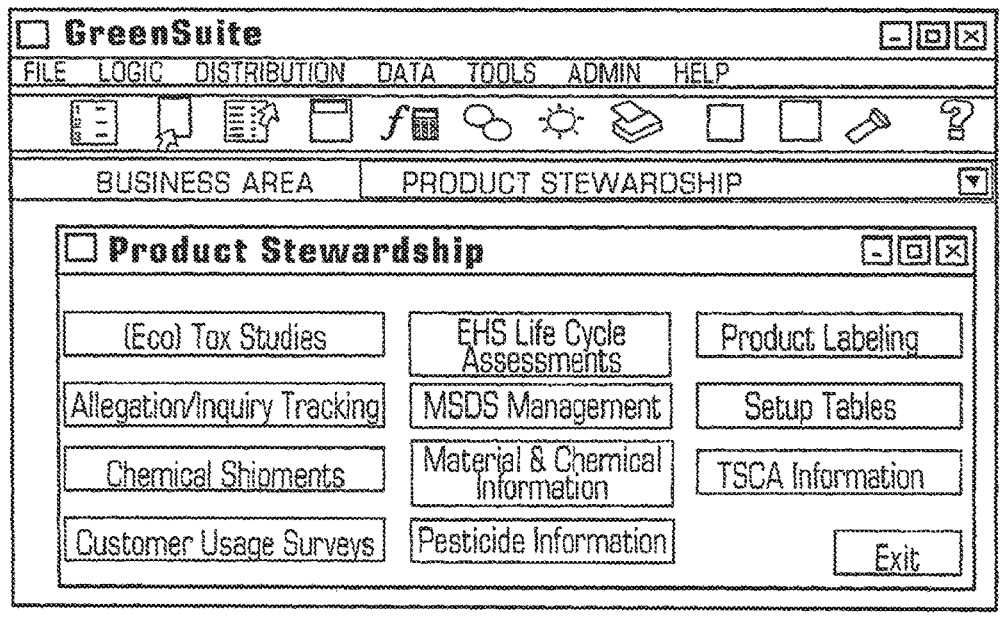
Figure 18:
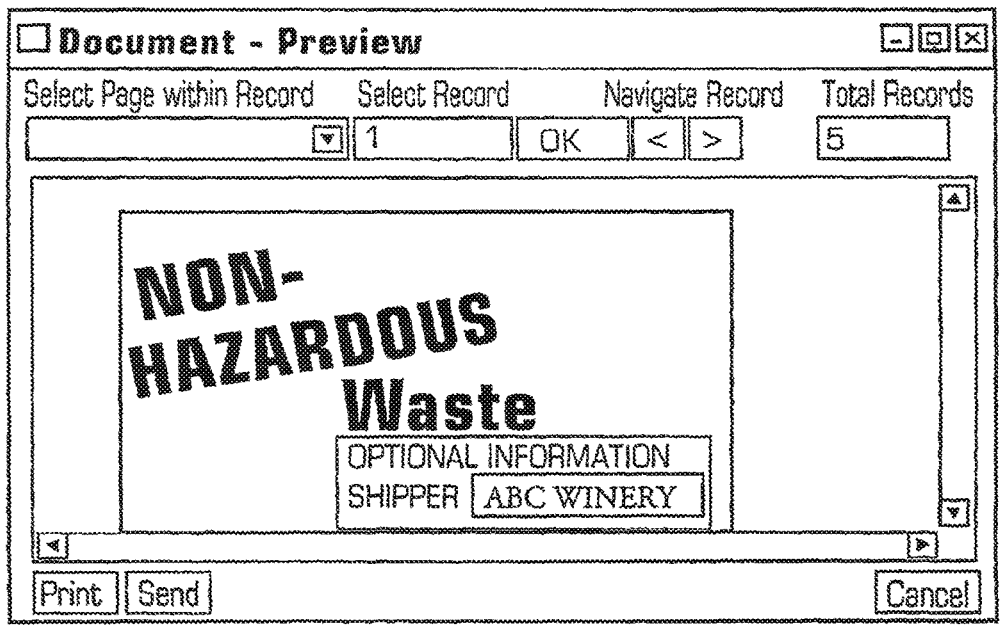
Figure 19:
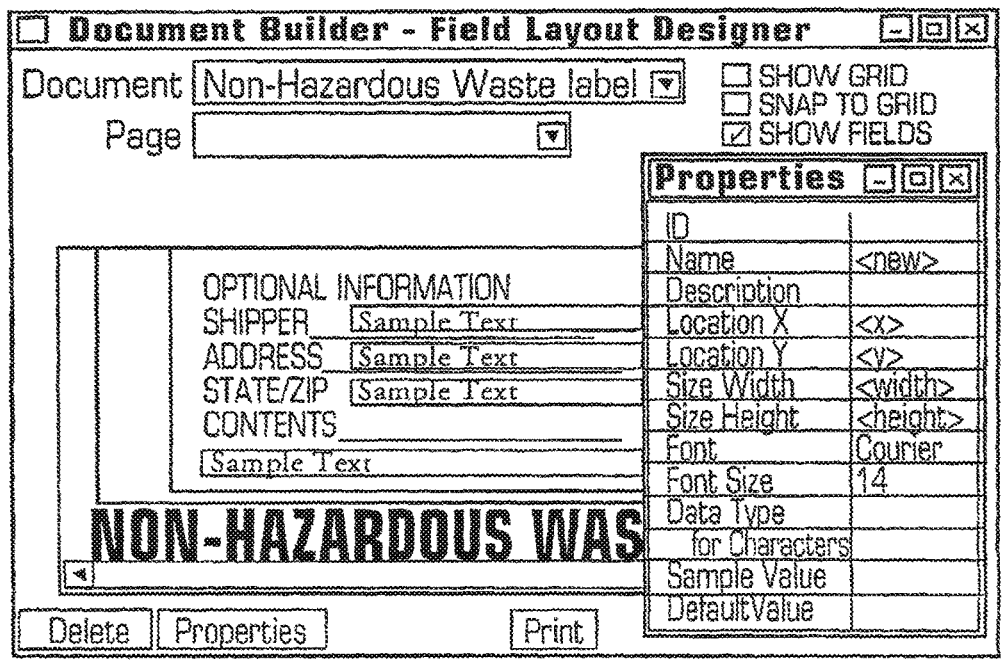

FIG. 8 is an image of a screen showing the invention with an EH&S business solution, referred to as "GreenSuite", enabled in the main menu. FIG. 9 shows the business groups for a business area within the EH&S business solution. FIG. 10 shows an example of a WorkList. FIG. 11 shows an example of a configuration tool used to create WorkLists. FIG. 12 shows an example of a data entry form. FIG. 13 shows an example of a configuration tool used to create data entry forms. FIG. 14 shows an example of a report. FIG. 15 shows an example of a configuration tool used to create reports. FIG. 16 shows an example of processing results. FIG. 17 show an example of configuration tool used to create data processing. FIG. 18 shows an example of a document. FIG. 19 shows an example of a configuration tool used to create documents.

In summary, the system accepts new data and forms and changes to existing data and forms, determines links of each entered data item to one or more of the sections and modules within a section, adds the data item to, or uses the data item to upgrade an extant data item within, one or more modules, and implements any quantitative or qualitative changes that should be made in the remainder of the system as a result of entry of the data item.

The system also provides tools, including formulas, algorithms, functional descriptions and presentation formats that use one or more already-entered data items to compute or obtain one or more values that can be (1) presented as an output value for a report or other presentation on facility operations and/or (2) used to determine whether the facility complies with relevant regulations and/or (3) used to indicate an affirmative response corrective action to be taken or already taken in facility operations.

Closing Comments

This Appendix provides definitions for various objects used in the invention.

The invention in one embodiment uses a "thin client" approach in a client/server mode, in which a relatively unsophisticated client server at the user's site is connected through the Internet or another network to a server that provides one or more databases of information and provides substantially all of the analysis and processing capability for this information. A client or end user enters certain characteristics of information that the user wishes to obtain or process, and the server helps the user to build one or more queries that present the request to the database(s) in a form the database(s) can respond to provide all the information the user has requested.

This "thin client" approach allows the combined server/client system to take advantage of the separate strengths of the server (simple and/or complex database structures, use of on-line transaction processing tools) and of the client (use of GUI, Windows and Windows applications) without requiring unnecessary duplication of these capabilities. After the user has disconnected from the server, no server programs remain on the user's terminal This approach requires only modest user terminal capabilities (20 Mbytes of hard drive space, 8 Mbytes of RAM, a PC or Macintosh or Sun terminal with a mouse, Netscape Navigator 4.1+ or Internet Explorer 4+) and TCP/IP communications capability. The server or host terminal provides all of the database capability and most of the processing power and preferably includes a database structure such as Oracle 7.3+, 2 Gbytes of hard drive space, 256 Mbytes of RAM and TCP/IP capability.

Introduction of some definitions is appropriate here. A "database" is a collection or group of objects that holds various related information items. This information is divided into tables, views, columns and rows, and an object is identified by its name and/or icon in a database.

A "table" is a structure that holds data in a database, often as one or more two-dimensional structures divided into rows and columns. An example of a table is a spreadsheet. A table is often referred to as a physical file.

A "view" is an alternative representation of data in a table and may appear as one or more columns and/or one or more rows. The data attributes can change according to the format in which a view is presented. A view may be an overlay of a table structure but does not replace the table. A view is often referred to as a logical file.

A "base table" is a table that is referenced in a view or a query.

An "image" refers to a document image on a screen or a Web page that can be called up and viewed, printed, transmitted and attached to a relevant business record.

A "parent" table, view or form may provide information that is used directly to help construct or supplement a corresponding "child" table, view or form.

A "column" is one or more vertically oriented parts of a (two-dimensional) Table and is identified by specifying specific information in a table. Each column will have one data type (character, decimal, hexadecimal, integer, alphanumeric, etc.). A row-column intersection is often referred to as a field.

A "foreign key column" is a column whose data source is a parent primary key column.

A "row" is one or more vertical parts of a Table and consists of a selected sequence of values drawn from one or more columns—one value for each column. Row entries are actual data in a table. A row is often referred to as a record.

A "query" is a request to select, format and process/analyze one or more rows of data in a table and can operate on one or more tables. A query must specify (1) where the requested data are stored, (2) what are the common elements, if any, of the tables and/or views to be searched, (3) what data item(s) (usually, one or more columns) the user wishes to select, and (4) what criteria are applied to a data item. A query provides reporting Capability and processing/data analysis capability, using spreadsheets and other tools.

A "query editor" receives a user request and takes the user through all steps required to build a query to which the system can respond. A query definition is created in Structured Query Language (SQL). A query editor stores the information needed to create an SQL statement.

A "query filter condition" is a method for applying restrictions on data retrieved by a query.

A "trigger event" is an action performed by a user of the system that initiates another action or set of actions.

A "form level trigger" is part of a form application and is activated only when a specific trigger point is executed with the form application.

A "stacked area chart" is a bar type chart in which different data components are displayed as separate regions on a single, vertical or horizontal bar.

A "report filter" is a method for applying restrictions on the data retrieved by a report.

A table "join" reassembles the data that appears in a full row, using common columns that exist in two or more tables to associate the data. Stated more abstractly, a table join expresses a relationship between two or more rows of data in logically distinct tables.

An "innerjoin," also referred to as an "equal join," is the most common join type, returning or associating rows that match between common columns in two or more tables. An "outer join" returns or associates all rows in two or more tables, whether or not the rows match.

A "direct join" occurs when two or more Tables being joined together share a common column. An "indirect join" occurs when two or more tables being joined together do not share a common column; in an indirect join, one or more intermediate tables may share one common column with one table being joined and share another common column with another table being joined.

When a table join is created between a first table and a second table, the relationship created between the two tables may be one-to-many, with each record in the first table being unique, and with many corresponding records in the second table. This is the preferred data representation and provides accuracy. An alternative relationship, usually undesirable because of the possibility of duplication, is many-to-many, in which at least one record in each of the first and second tables is not unique. For example, multiple records in the first table may match multiple records in the second table.

An "expression" applies specified operations to data and defines row selection criteria, for example, by determining which rows of data will be returned in response to a query.

A "parameter" is a procedure created within the system to return a value in response to a query. For example, a parameter may be created to return a location name, a threshold value of some variable, or a begin date or end date. A parameter may be changed each time the (same) query is executed. A value, to be returned to the requester, may be placed into a parameter in either of two ways: (1) a default value is entered and (ii) a value is entered after the associated procedure is run. A value is entered into the parameter at process run time, and this value is used (1) to define a new result column or (2) in an expression, to define one or more selection criteria for the number of rows returned by the query. A result column applies specified operations to data and returns a new column of data. An SQL function and arithmetic operators can be used to create a result column. A result column can be used to provide several data types, including calculated values, summary values and data processing values.

An SQL function performs operations on data and returns specific values based on the results of those operations. An SQL function may be applied to a unique data type, such as numeric, alphanumeric, character or date data, or may be used in a query definition to define a result column or an expression. A SQL function may be used in a query definition to define a result column or an expression.

Arithmetic function processing manipulates numeric data, for example, by performing arithmetic, logarithmic, trigonometric and/or statistical operations. String function processing manipulates alphanumeric data, including the operations of combining, extracting and movement of character locations. Data function processing manipulates date data to perform, for example, delay time arithmetic. The arithmetic functions include summation, subtraction, formation of an absolute value and of a trigonometric value for a numeric data item. A string function combines a plurality of strings, to form concatenated expressions, and extracts one or more characters from a string.

A "set function" groups data according to common values and returns a single summary row. A set function determines the values returned for a result column Date operations, one of the most common uses for a result column, include (1) conversion of date data into a desired format (such as MM/DD/YYYY), (2) conversion of string data into a date value, calculation of days remaining in a given month, and (4) calculation of the date and day one year ago. Date processing involves conversion of column values to a formatted date string, including specification of century (CC, SCC), year (SYYY, YYYY, YEAR, SYEAR, YYY, YY, Y), quarter (Q), month (MONTH, MON, MM, RM), day (DDD, DD), starting day of the week (DY, D), same day of the week as first day of the year (WW) and same day of the week as first day of the month (W).

The system also employs the Boolean connectives "AND" (in which both conditions must be satisfied in order for a row to be included in the result set), "OR" (in which, if either of the conditions is met, a row is included in the result set) and "GROUP" ( ) which organizes data between the parentheses for processing.

A database developer usually has several design goals, including (i) maximization of the amount of database information available and (ii) minimization, if not elimination, of duplication of information in the database. These two goals are sometimes at odds with each other. A typical database will have multiple tables, chosen to help achieve the goal of minimum duplication. This minimum duplication goal is sometimes helped by breaking a full row of data into separate tables.

It is claimed:

1. A system comprising a server system accessible by a browser executed on a client device, the server system including a first portion, a second portion, a third portion, and a fourth portion;
   the first portion of the server system having information about unique aspects of a particular application including data representative of structures and functions associated with the particular application;
   the second portion of the server system having information about user interface elements and one or more functions common to various applications including the particular application;
   the third portion of the server system being configured to dynamically generate a functionality and a user interface for the particular application, the functionality and the user interface of the particular application being based on the information in the first portion of the server system and the information in the second portion of the server system;
   the third portion of the server system being configured to send the functionality and the user interface for the particular application to the browser;
   the fourth portion of the server system being configured to automatically detect changes to metadata of the particular application and cause the user interface elements that affect the particular application to be modified accordingly.

2. The system of claim 1 wherein the information of the first portion of the server system includes at least one of business knowledge, logical designs, physical designs, physical structures, and relationships associated with one or more predetermined business applications.

3. The system of claim 1 wherein the information of the second portion of the server system includes at least one of tools, worklists, data entry points, reports, documents, processes, formulas, and images.

4. The system of claim 1 wherein the third portion of the server system is configured to provide a set of instructions to the client device, the set of instructions being associated with at least one of the functionality or the user interface of the particular application, the set of instructions configured to be executed on the client device, the set of instructions configured to communicate information associated with at least one of the first information or the second information.

5. The system of claim 1 wherein the fourth portion is further configured to automatically cause the functionality to be changed accordingly with the detected changes.

6. A system comprising:
a server computer system;
a first layer associated with the server computer system containing information about the unique aspects of a particular application, including data representative of structures and functions associated with at least the particular application;
a second layer associated with the server computer system containing information about the user interface and functions common to a variety of applications including the particular application, the particular application being generated based on the data in both the first and second layers;
a third layer associated with the server computer system that retrieves the data in the first and second layers in order to generate the functionality and user interface elements of the particular application; and
a fourth layer associated with the server computer system that automatically detects changes to metadata of the particular application and causes the functionality of the particular application as defined in the first layer to be modified accordingly.

7. The system of claim 6 wherein the third layer further comprises a data management layer having software instructions for distributing one or more applets to client computers wherein the applets dynamically generate and present the user interface and functionality to the user based on the first and second layers.

8. The system of claim 6 wherein the change management layer further comprises one or more intelligent agents that detect changes in the metadata.

9. The system of claim 6 wherein the fourth layer automatically causes the user interface of the particular application as defined in the first layer to be changed accordingly with the detected changes.

10. A method for generating applications using a server computer system, the method comprising:
storing in a first layer information about the unique aspects of a plurality of applications including data representative of structures and functions associated with at least one of the applications;
storing in a second layer information about a user interface and functions common to the applications;
using the data in the first and second layers to generate a functionality and a user interface for the one of the applications;
automatically detecting changes to metadata of the particular application and automatically modifying the first layer based upon the changes; and
causing the user interface of the particular application to be dynamically re-generated each time a client establishes a connection with the server computer based upon the data in the first layer and the data in the second layer.

11. The method of claim 10 wherein the first layer comprises a business content database storing the information.

12. The method of claim 10 detecting changes is by one or more intelligent agents.

13. A server system for generating an application comprising:
a first layer containing information about the unique aspects of a particular application;
a second layer containing information about the user interface and functions common to a variety of applications including the particular application, the second layer further including metadata representative of structures and functions associated with at least the particular application;
a third layer that retrieves the data in the first and second layers in order to generate functionality and user interface elements of the application;
a change management layer for automatically detecting changes to the metadata;
a first portion configured to generate a particular application based on the first and second layers upon connection by an authorized client computer; and
a second portion configured to distribute the user interface and functionality of the particular application to the authorized client computer.

14. The server system of claim 13 wherein the third layer further comprises a data management layer configured to distribute one or more applets to the authorized client computer wherein the applets dynamically generate and present the user interface and functionality to the user based on the first and second layers.

15. The server system of claim 13 wherein the second layer comprises a metadata database comprising data about the structures and functions associated with any of the variety of applications.

16. The server system of claim 15 wherein the metadata database further comprises data about the user interface including one or more of tools, worklists, data entry forms, reports, documents, processes, formulas and images.

17. The server system of claim 13 wherein the change management layer further comprises one or more intelligent agents that detect changes to the metadata.

18. The server system of claim 13 wherein the fourth portion is further configured to automatically cause the functionality to be changed accordingly with the detected changes.

* * * * *

UNITED STATES PATENT AND TRADEMARK OFFICE
CERTIFICATE OF CORRECTION

PATENT NO. : 10,616,286 B2  
APPLICATION NO. : 15/368160  
DATED : April 7, 2020  
INVENTOR(S) : Richard Frankland et al.

Page 1 of 1

It is certified that error appears in the above-identified patent and that said Letters Patent is hereby corrected as shown below:

On the Title Page

Column 1, Lines 19-20 please delete:
"This patent is subject to a terminal disclaimer"

Signed and Sealed this
Twenty-ninth Day of September, 2020

Andrei Iancu
*Director of the United States Patent and Trademark Office*